United States Patent
Matsuoka

(10) Patent No.: US 9,282,480 B2
(45) Date of Patent: Mar. 8, 2016

(54) RADIO COMMUNICATION APPARATUS AND METHOD ESTABLISHING DISCONTINUOUS TRANSMISSION AND RECEPTION CYCLES

(71) Applicant: FUJITSU LIMITED, Kawasaki-shi, Kanagawa (JP)

(72) Inventor: Hideki Matsuoka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 14/150,407

(22) Filed: Jan. 8, 2014

(65) Prior Publication Data

US 2014/0287789 A1    Sep. 25, 2014

(30) Foreign Application Priority Data

Mar. 21, 2013 (JP) ................................ 2013-058643

(51) Int. Cl.

| | | |
|---|---|---|
| H04W 76/04 | (2009.01) | |
| H04W 24/08 | (2009.01) | |
| H04W 52/02 | (2009.01) | |
| H04W 88/02 | (2009.01) | |
| H04W 88/08 | (2009.01) | |

(52) U.S. Cl.
CPC .......... *H04W 24/08* (2013.01); *H04W 52/0216* (2013.01); *H04W 52/0229* (2013.01); *H04W 52/0258* (2013.01); *H04W 76/048* (2013.01); *H04W 88/02* (2013.01); *H04W 88/08* (2013.01)

(58) Field of Classification Search
CPC .................................................. H04W 76/048
See application file for complete search history.

(56) References Cited

U.S. PATENT DOCUMENTS

| | | | |
|---|---|---|---|
| 2005/0030918 A1 | 2/2005 | Motegi et al. | |
| 2007/0276904 A1* | 11/2007 | Satou | 709/203 |
| 2008/0056229 A1* | 3/2008 | Gholmieh et al. | 370/349 |
| 2008/0181127 A1* | 7/2008 | Terry et al. | 370/252 |
| 2008/0186892 A1* | 8/2008 | Damnjanovic | 370/311 |
| 2008/0186893 A1* | 8/2008 | Kolding et al. | 370/311 |
| 2008/0248840 A1* | 10/2008 | Kim et al. | 455/574 |

(Continued)

FOREIGN PATENT DOCUMENTS

| | | |
|---|---|---|
| EP | 2519060 A1 | 10/2012 |
| EP | 2547166 A1 | 1/2013 |
| JP | 2005-026991 | 1/2005 |

OTHER PUBLICATIONS

EESR—The Extended European Search Report issued on Oct. 30, 2014 for corresponding European Application No. 14150104.9.

*Primary Examiner* — Bobbak Safaipour
*Assistant Examiner* — Devan Sandiford
(74) *Attorney, Agent, or Firm* — Fujitsu Patent Center

(57) ABSTRACT

A radio terminal apparatus is operable in a discontinuous communication mode in which at least one of transmission and reception for communicating with a radio base station is performed periodically and discontinuously. The radio terminal apparatus includes a measurement unit configured to measure time from when download of data via the radio base station is completed to when download of the next data is requested in response to a user operation, a transmitting unit configured to transmit time information on the time measured by the measurement unit to the radio base station, and a radio control unit configured to acquire, from the radio base station, a parameter indicating at least one of a transmission period and a reception period that is determined on the basis of the time information, and control the discontinuous communication mode.

7 Claims, 19 Drawing Sheets

(56) References Cited

U.S. PATENT DOCUMENTS

| | | |
|---|---|---|
| 2009/0201843 A1 | 8/2009 | Wang |
| 2009/0262648 A1* | 10/2009 | Chun et al. .................... 370/241 |
| 2009/0303927 A1* | 12/2009 | Kolding et al. .............. 370/328 |
| 2010/0002615 A1 | 1/2010 | Gupta |
| 2010/0034127 A1* | 2/2010 | Iwamura et al. ............. 370/311 |
| 2010/0120429 A1* | 5/2010 | Kazmi et al. .................. 455/436 |
| 2011/0199905 A1* | 8/2011 | Pinheiro et al. .............. 370/235 |
| 2011/0199910 A1* | 8/2011 | Oh et al. ....................... 370/241 |
| 2012/0127934 A1* | 5/2012 | Anderson et al. ............ 370/329 |
| 2012/0231747 A1* | 9/2012 | Chen et al. ..................... 455/68 |
| 2014/0295820 A1* | 10/2014 | Kim et al. ..................... 455/418 |
| 2015/0005018 A1* | 1/2015 | Klatt ............................ 455/458 |

\* cited by examiner

FIG. 10

(EXAMPLES OF DTX/DRX INFORMATION PARAMETERS)

| PARAMETER NAME | | UNIT | SETTING VALUE (EXAMPLE) |
|---|---|---|---|
| UE_DTX_Cycle_1 | E-DCH TTI=2ms | SUB-FRAME | 1, 4, 5, 8, 10, 16, 20 |
| | E-DCH TTI=10ms | | 1, 5, 10, 20 |
| UE_DTX_Cycle_2 | E-DCH TTI=2ms | SUB-FRAME | 4, 5, 8, 10, 16, 20, 32, 40, 64, 80, 128, 160 |
| | E-DCH TTI=10ms | | 5, 10, 20, 40, 80, 160 |
| MAC_Inactivity_Threshold | | E-DCH TTI | 1, 2, 4, 8, 16, 32, 64, 128, 256, 512, ∞ |
| UE_DPCCH_Burst_1 | | SUB-FRAME | 1, 2, 5 |
| UE_DPCCH_Burst_2 | | SUB-FRAME | 1, 2, 5 |
| UE_DRX_Cycle | | SUB-FRAME | 4, 5, 8, 10, 16, 20 |

FIG. 13

| MEASUREMENT NO. | MEASUREMENT TIME [sec] |
|---|---|
| N (CURRENT) | 12.235 |
| N − 1 | 80.095 |
| N − 2 | 1.367 |
| N − 3 | 9.345 |
| N − 4 | 15.123 |
| AVERAGE | 23.633 |
| TIME INFORMATION (NASI) | 50 SUB-FRAMES |

FIG. 14

| DETERMINATION CONDITION | VALUE AFTER CONVERSION |
|---|---|
| $Th(0) <$ VALUE | 1,000 SUB-FRAMES |
| $Th(1) <$ VALUE $\leq Th(0)$ | 500 SUB-FRAMES |
| ⋮ | ⋮ |
| $Th(q) <$ VALUE $\leq Th(q-1)$ | 200 SUB-FRAMES |
| VALUE $\leq Th(q)$ | PRESCRIBED VALUE |

RADIO COMMUNICATION APPARATUS AND METHOD ESTABLISHING DISCONTINUOUS TRANSMISSION AND RECEPTION CYCLES

CROSS-REFERENCE TO RELATED APPLICATION

This application is based upon and claims the benefit of priority of the prior Japanese Patent Application No. 2013-058643, filed on Mar. 21, 2013, the entire contents of which are incorporated herein by reference.

FIELD

The embodiments discussed herein are related to a radio terminal apparatus, a communication control apparatus, and a radio communication method.

BACKGROUND

In a radio communication system, a radio terminal apparatus connects to a radio base station and performs data communication via the radio base station. Such a radio communication system is widely used today. The timing when the radio terminal apparatus performs data communication is dependent on a user operation. Therefore, there may be a period during which data communication between the radio terminal apparatus and the base station is intensive, and a period during which there is no data communication. For example, when the user accesses to a Web site, data of the Web page is received in bursts. Then, while the user is browsing the Web page, no data is received.

It is costly and inefficient for a radio communication system to have data communication between a radio terminal apparatus and a radio base station available at any time even during the period in which there is no data communication. In view of this, some radio communication systems are designed such that, if there is no data communication for a certain period of time, a radio terminal apparatus may periodically and discontinuously perform transmission and reception.

For instance, discontinuous communication control called Continuous Packet Connectivity (CPC) is defined by High Speed Packet Access (HSPA), which is a communication standard developed as an extension of Wideband Code Division Multiple Access (W-CDMA).

According to CPC defined by HSPA, a radio network controller (RNC) in a radio access network notifies a radio terminal apparatus of a discontinuous reception (DRX) period and a discontinuous transmission (DTX) period.

The radio terminal apparatus discontinuously receives control information on a downlink control channel from a radio base station in the notified DRX period. When there is data to be transmitted in the downlink, the presence of data is notified to the radio terminal apparatus at the next DRX timing. Further, the radio terminal apparatus discontinuously transmits control information on an uplink control channel to the radio base station in the notified DTX period. When there is data to be transmitted in the uplink, the presence of data is notified to the radio base station at the next DTX timing.

With regard to control of discontinuous communication, a mobile communication system has been proposed that includes a radio base station and a plurality of mobile stations which are operable in three modes: active mode, idle mode, and battery saving mode (see, for example, Japanese Laid-open Patent Publication No. 2005-26991). This radio base station sets the transmission period of a paging channel to 40 ms if the mobile station is operating in the idle mode, and sets the transmission period of the paging channel to 80 ms if the mobile station is operating in the battery saving mode. Thus, the mobile station receives the paging channel in the period set by the radio base station.

In the mobile communication system described above, a common reception period of 40 ms is set for all the mobile stations that are operating in the idle mode, and a common reception period of 80 ms is set for all the mobile stations that are operating in the battery saving mode.

However, it is difficult to determine a reasonable fixed communication period for all the radio terminal apparatuses. If the communication period increases, the time period during which a transmission circuit and a reception circuit of the radio terminal apparatus may be suspended increases. Therefore, it is possible to reduce power consumption of the radio terminal apparatus.

However, an increase in the communication period might increase the time lag between when data communication is requested in response to a user operation and when data communication actually starts. This results in a delayed response to the user operation. Accordingly, the communication period appropriate for a radio terminal apparatus varies depending on the tendency of user operations.

SUMMARY

According to an aspect of the invention, there is provided a radio terminal apparatus that is operable in a discontinuous communication mode in which at least one of transmission and reception for communicating with a radio base station is performed periodically and discontinuously. The radio terminal apparatus includes a measurement unit configured to measure time from when download of data via the radio base station is completed to when download of the next data is requested in response to a user operation, a transmitting unit configured to transmit time information on the time measured by the measurement unit to the radio base station, and a radio control unit configured to acquire, from the radio base station, a parameter indicating at least one of a transmission period and a reception period that is determined on the basis of the time information, and control the discontinuous communication mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates examples of parameters used for discontinuous transmission on an uplink Dedicated Physical Control Channel and discontinuous reception on a High-Speed Shared Control Channel;

FIG. 13 illustrates an example of a method of generating time information according to the second embodiment;

FIG. 14 illustrates an example of a method of using time information according to the second embodiment;

DESCRIPTION OF EMBODIMENTS

Figure 1:
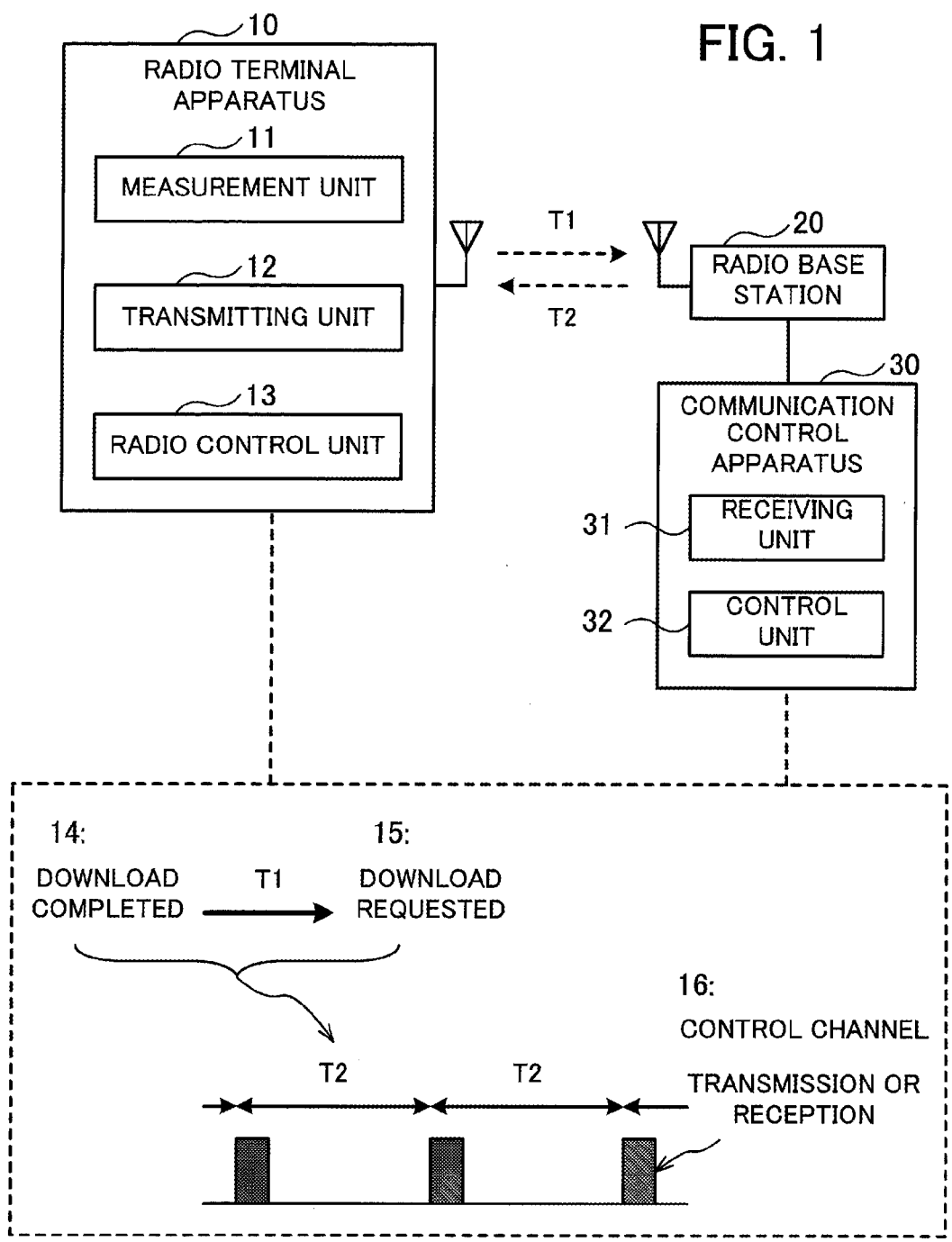
FIG. 1 illustrates an example of a radio terminal apparatus according to a first embodiment.

Several embodiments will be described below with reference to the accompanying drawings, wherein like reference numerals refer to like elements throughout.

(a) First Embodiment

Hereinafter, a first embodiment will be described.

FIG. 1 illustrates an example of a radio terminal apparatus 10 according to the first embodiment.

The radio terminal apparatus 10 is operable in a discontinuous communication mode in which at least one of transmission and reception for communicating with a radio base station 20 is performed periodically and discontinuously. As illustrated in FIG. 1, the radio terminal apparatus 10 includes a measurement unit 11, a transmitting unit 12, and a radio control unit 13.

The measurement unit 11 measures time T1 from when download of data via the radio base station 20 is completed (14) to when download of the next data is requested (15) in response to a user operation. For example, if image data is downloaded, the radio terminal apparatus 10 performs decoding, image quality enhancement processing, and the like, on the image data so as to generate display data that may be displayed on a display. The display data is stored in a frame buffer. The measurement unit 11 starts a timer when preparation for displaying the display data is completed and the frame buffer is confirmed to be empty. Then, if a user operation is received, the measurement unit 11 stops the timer.

The transmitting unit 12 transmits time information on the time T1 measured by the measurement unit 11 to the radio base station 20. The radio control unit 13 acquires, from the radio base station 20, a parameter T2 indicating at least one of a transmission period and a reception period that is determined on the basis of the time information, and controls the discontinuous communication mode. For example, the parameter T2 is transmitted from the radio base station 20 to the radio terminal apparatus 10 at the time when the discontinuous communication mode is activated.

The discontinuous communication mode is activated if the amount of packets transmitted by the radio terminal apparatus 10 is less than a threshold or is zero for a predetermined time period, for example. During the discontinuous communication mode, the radio terminal apparatus 10 and the radio base station 20 discontinuously perform transmission or reception (16) on the control channel in accordance with the discontinuous communication period indicated by the parameter T2, for example.

The communication control apparatus 30 controls the radio base station 20. The communication control apparatus 30 includes a receiving unit 31 and a control unit 32. The receiving unit 31 receives the time information via the radio base station 20. The control unit 32 determines the parameter T2 indicating at least one of a transmission period and a reception period on the basis of the time information, and transmits the parameter T2 to the radio terminal apparatus 10 via the radio base station 20.

With the configuration described above, it is possible to set a discontinuous communication period that is appropriate in terms of reducing power consumption of the radio terminal apparatus 10 and reducing the delay in responding to a user operation.

The above is the description of the first embodiment.

(b) Second Embodiment

Hereinafter, a second embodiment will be described.
(Radio Communication System)

Figure 2:
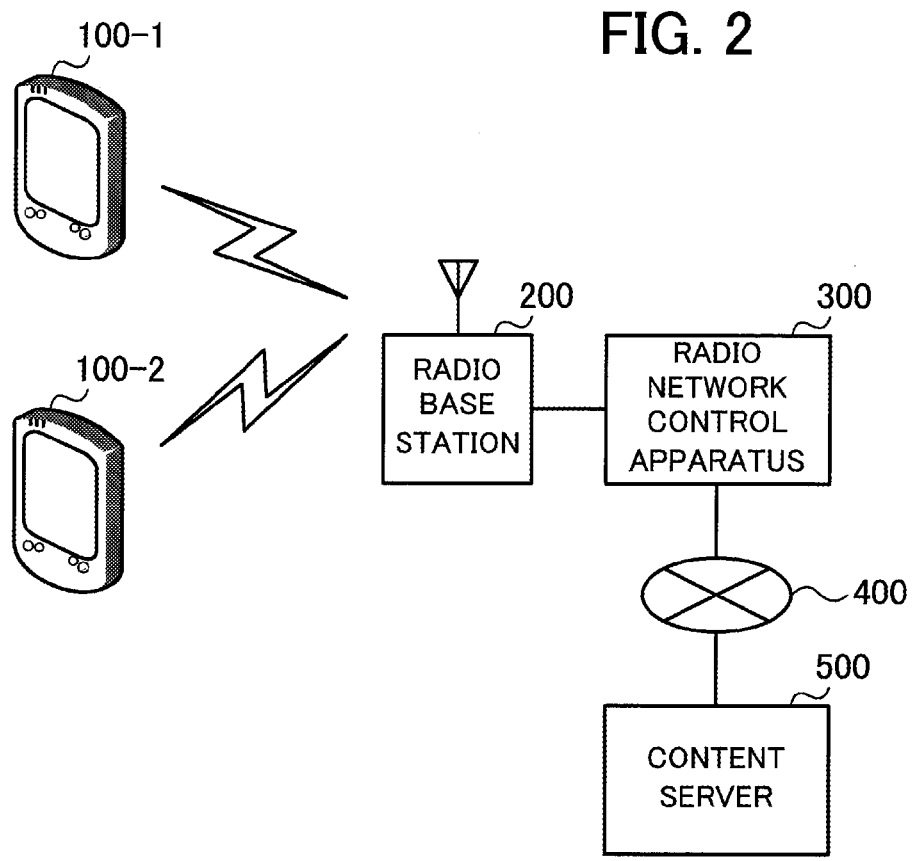
FIG. 2 illustrates an example of a radio communication system according to a second embodiment.

FIG. 2 illustrates an example of a radio communication system according to the second embodiment.

As illustrated in FIG. 2, the radio communication system of the second embodiment includes radio terminal apparatuses 100-1 and 100-2, a radio base station 200, a radio network control apparatus 300, and a content server 500. The radio network control apparatus 300 and the content server 500 are connected via a core network 400.

In the example of FIG. 2, two radio terminal apparatuses 100-1 and 100-2 are illustrated. However, the radio communication system may include three or more radio terminal apparatuses. Further, in the example of FIG. 2, only one radio base station 200 is illustrated. However, the radio communication system may include two or more radio base stations. Further, in the example of FIG. 2, the radio base station 200 and the radio network control apparatus 300 are provided separately. However, the radio base station 200 and the radio network control apparatus 300 may be integrated into a single unit. In the following description, the radio terminal apparatuses 100-1 and 100-2 are not distinguished from one another, and are simply referred to as radio terminal apparatuses 100.

The radio terminal apparatus 100 is an example of a user terminal that is capable of transmitting and receiving data in accordance with a predetermined radio communication protocol. Examples of the radio terminal apparatus 100 include user equipment (UE) used in the systems such as W-CDMA, HSPA, Long Term Evolution (LTE), and the like. The radio terminal apparatus 100 may be a mobile phone, smartphone, personal computer, tablet computer, or various other types of apparatuses, for example.

The radio base station 200 performs processing on the physical layer, such as frequency conversion from baseband signals to radio frequency (RF) signals, error correction coding and decoding, modulation and demodulation, and the like. In the W-CDMA system, the radio base station 200 also performs processing such as spread spectrum, and the like. W-CDMA defines a logical node called a Node B that performs processing on the physical layer, such as those described above. A base transceiver station (BTS) implemented as a Node B in the W-CDMA system is an example of the radio base station 200.

There are radio channels between the radio terminal apparatus 100 and the radio base station 200, such as Dedicated Physical Control Channel (DPCCH), Enhanced Dedicated Channel (E-DCH), High-Speed DPCCH (HS-DPCCH), High-Speed Shared Control Channel (HS-SCCH), E-DCH Absolute Grant Channel (E-AGCH), E-DCH Relative Grant Channel (E-RGCH), E-DCH Dedicated Physical Control Channel (E-DPCCH), E-DCH Dedicated Physical Data Channel (E-DPDCH), Fractional Dedicated Physical Channel (F-DPCH), High-Speed Physical Downlink Shared Channel (HS-PDSCH), Primary Common Control Physical Channel (P-CCPCH), and the like.

The radio network control apparatus 300 controls the radio base station 200. The radio network control apparatus 300 performs call setting, processing related to the service quality, management of the radio resources, processing related to the Automatic Repeat Request (ARQ) protocol, and the like. Examples of the radio network control apparatus 300 include a radio network system (RNS) and a radio network controller (RNC) in the W-CDMA system.

The radio network system includes a radio network controller and multimedia processing equipment (MPE). The radio network controller has functions of media access control (MAC), radio link control (RLC), and radio resource control (RRC). For example, the radio network controller controls base transceiver stations, and performs connection control for incoming and outgoing calls, call termination control, diversity handover control, processing for selecting and combining signals transmitted from the same user equipment via a plurality of base transceiver stations, distribution of copies to the plurality of base transceiver stations, and the like. On the other hand, the multimedia processing equipment performs an operation for controlling protocol conversion of user signals between a core network side and a radio network side, and the like.

The radio network control apparatus 300 controls discontinuous communication called CPC, which is defined by communication standards such as HSPA and the like, for example. In CPC defined by HSPA, a radio network controller in a radio access network notifies a radio terminal apparatus 100 of a DRX period and a DTX period. The radio terminal apparatus 100 discontinuously receives control information on a downlink control channel from the radio base station 200 in the notified DRX period.

When there is data to be transmitted in the downlink, the presence of data is notified to the radio terminal apparatus 100 at the next DRX timing. Further, the radio terminal apparatus 100 discontinuously transmits control information on an uplink control channel to the radio base station 200 in the notified DTX period. If there is data to be transmitted in the uplink, the presence of data is notified to the radio base station 200 at the next DTX timing.

The content server 500 is a server apparatus that provides content data such as still image data, moving image data, audio data, text data, and the like. The content server 500 is connected to the radio network control apparatus 300, via the core network 400 and a network such as the Internet and the like, which is connected ahead of the core network 400. Examples of the content server 500 include a Web server, an application server, and the like. The content server 500 provides content data in response to a request from the user.

The above is the description of an example of the radio communication system according to the second embodiment. The following describes the hardware and functions of the radio terminal apparatus 100, the radio base station 200, and the radio network control apparatus 300 in greater detail.

(Hardware of Radio Terminal Apparatus)

Figure 3:
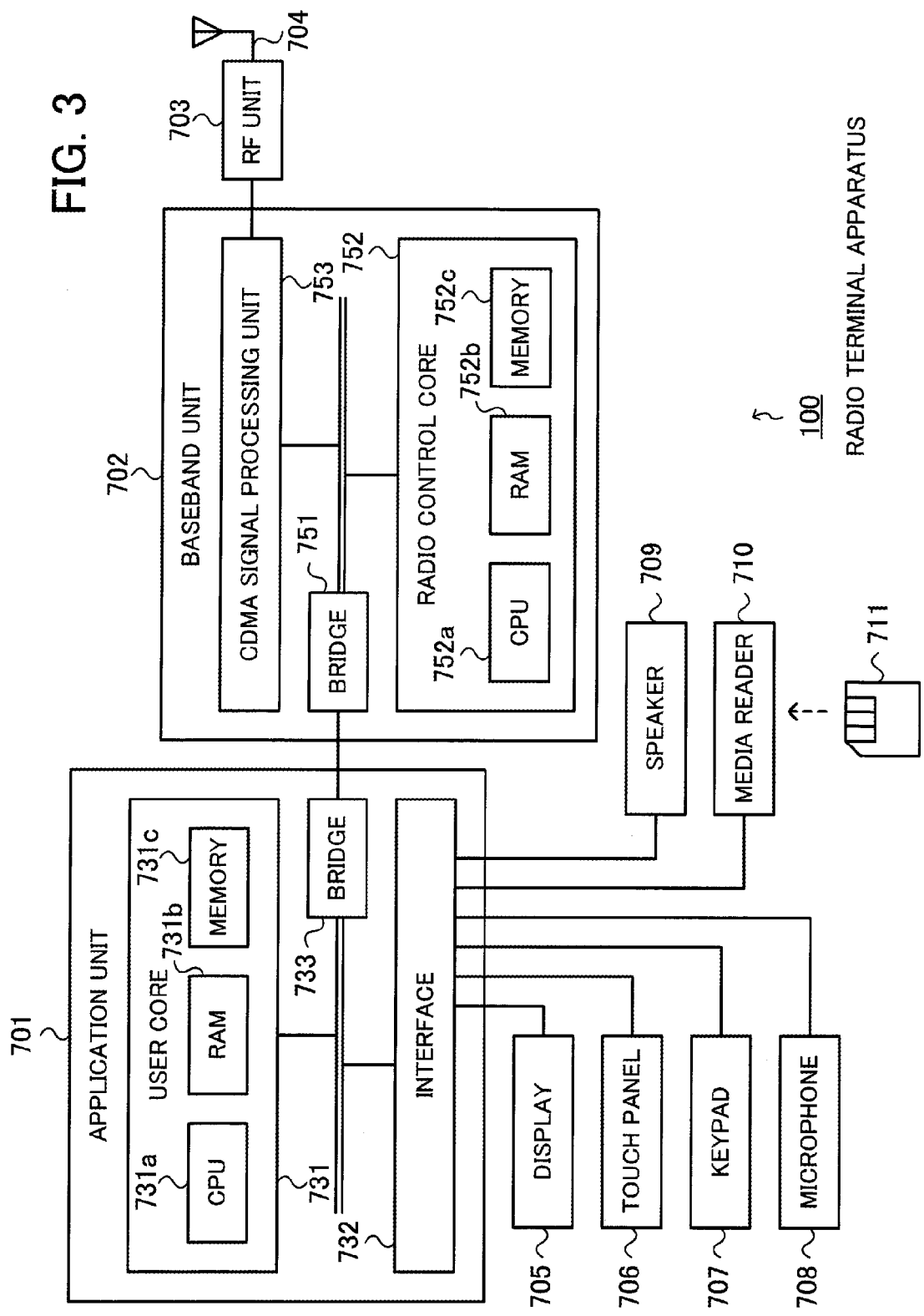
FIG. 3 illustrates an example of the hardware of a radio terminal apparatus according to the second embodiment.

The hardware of the radio terminal apparatus 100 will be described with reference to FIG. 3. FIG. 3 illustrates an example of the hardware of the radio terminal apparatus 100 according to the second embodiment.

As illustrated in FIG. 3, the radio terminal apparatus 100 includes an application unit 701, a baseband unit 702, a radio frequency (RF) unit 703, and an antenna 704. The radio terminal apparatus 100 further includes a display 705, a touch panel 706, a keypad 707, a microphone 708, a speaker 709, and a media reader 710.

The application unit 701 includes a user core 731, an interface 732, and a bridge 733. The user core 731 includes a central processing unit (CPU) 731a, a random access memory (RAM) 731b, and a memory 731c.

The CPU 731a is a processor including a computing unit that executes instructions described in a program. The CPU 731a loads at least part of programs and data stored in the memory 731c into the RAM 731b, and executes instructions described in the program.

The CPU 731a may include a plurality of processor cores. The user core 731 may include a plurality of CPUs 731a. In this case, the user core 731 is able to execute processes in parallel.

The RAM 731b is a volatile memory that temporarily stores a program executed by the CPU 731a and data used for processing. The memory 731c is an example of a non-volatile storage device that stores programs such as an operating system (OS), firmware, and application software, data used for processing, and the like.

The user core 731 may separately include a storage device such as a flash memory, a solid state drive (SSD), and the like. Further, the user core 731 may include a plurality of storage devices.

The interface 732 connects the application unit 701 to the display 705, the touch panel 706, the keypad 707, the microphone 708, the speaker 709, and the media reader 710. The bridge 733 allows exchange of data between the application unit 701 and the baseband unit 702. The user core 731, the interface 732, and the bridge 733 are connected to each other.

The baseband unit 702 includes a bridge 751, a radio control core 752, and a CDMA signal processing unit 753. The bridge 751 allows exchange of data between the application unit 701 and the baseband unit 702. The radio control core 752 includes a CPU 752a, a RAM 752b, and a memory 752c.

The CPU 752a is a processor including a computing unit that executes instructions described in a program. The CPU 752a loads at least part of programs and data stored in the memory 752c into the RAM 752b, and executes instructions described in the program.

The CPU 752a may include a plurality of processor cores. The radio control core 752 may include a plurality of CPUs 752a. In this case, the radio control core 752 is able to execute processes in parallel.

The CDMA signal processing unit 753 performs spread spectrum on a digitally modulated data signal by multiplying the data signal by a spreading code, and multiplexes a spread spectrum signal so as to generate a baseband signal. The RF unit 703 performs frequency conversion of the baseband signal to an RF signal, and transmits the RF signal via the antenna 704. The RF unit 703 receives the RF signal via the antenna 704, and performs frequency conversion of the RF signal to a baseband signal. The CDMA signal processing unit 753 decodes the baseband signal so as to generate a data signal.

The antenna 704 is used for transmitting and receiving radio frequency signals. In the example of FIG. 3, only one antenna is illustrated. However, the radio terminal apparatus 100 may include a plurality of antennas.

The display 705 may be a display device such as a liquid crystal display (LCD), a plasma display panel (PDP), an organic electro-luminescence display (GELD), and the like, for example.

The touch panel 706 and the keypad 707 are examples of input devices. The microphone 708 is an example of an audio input device that converts an input sound into an electrical signal. The speaker 709 is an example of an audio output device that outputs audio. The media reader 710 is a device that reads information recorded in a recording medium 711. The recording medium 711 may be a magnetic disk, an optical disc, a semiconductor memory, or the like.

The above is the description of the hardware of the radio terminal apparatus 100.

(Hardware of Radio Base Station)

Figure 4:
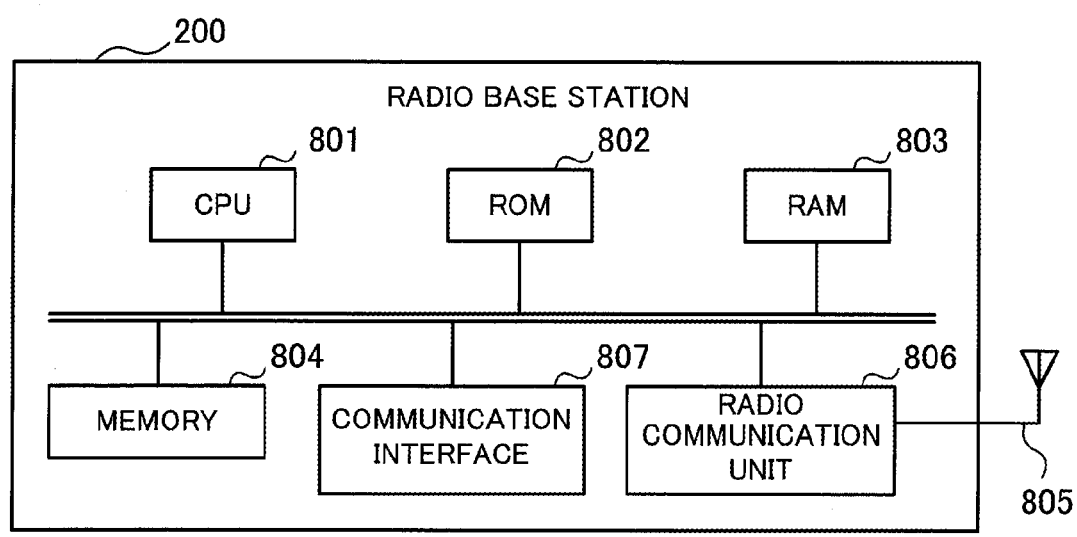
FIG. 4 illustrates an example of the hardware of a radio base station according to the second embodiment.

Next, the hardware of the radio base station 200 will be described with reference to FIG. 4. FIG. 4 illustrates an example of the hardware of the radio base station 200 according to the second embodiment.

As illustrated in FIG. 4, the radio base station 200 includes a CPU 801, a ROM 802, a RAM 803, a memory 804, an antenna 805, a radio communication unit 806, and a communication interface 807.

The CPU 801 is a processor including a computing unit that executes instructions described in a program. The CPU 801 loads at least part of programs and data stored in the ROM 802 or the memory 804 into the RAM 803, and executes instructions described in the program. The RAM 803 is a volatile memory that temporarily stores a program executed by the CPU 801 and data used for processing. The memory 804 is an example of a non-volatile storage device that stores programs such as an OS, firmware, and application software, data used for processing, and the like. Examples of the memory 804 include a flash memory, an SSD, and the like.

The antenna 805 is used for transmitting and receiving radio frequency signals. In the example of FIG. 4, only one antenna is illustrated. However, the radio base station 200 may include a plurality of antennas. The radio communication unit 806 operates in response to an instruction from the CPU 801, and controls connection and disconnection of a line for communication with the radio terminal apparatus 100.

The radio communication unit 806 exchanges data with the radio terminal apparatus 100 via the antenna 805 by radio. The radio communication unit 806 performs processing such as frequency conversion from baseband signals to RF signals, error correction coding and decoding, modulation and demodulation, and the like. The communication interface 807 is an interface for communicating with the radio network control apparatus 300.

The above is the description of the hardware of the radio base station 200.

(Hardware of Radio Network Control Apparatus)

Figure 5:
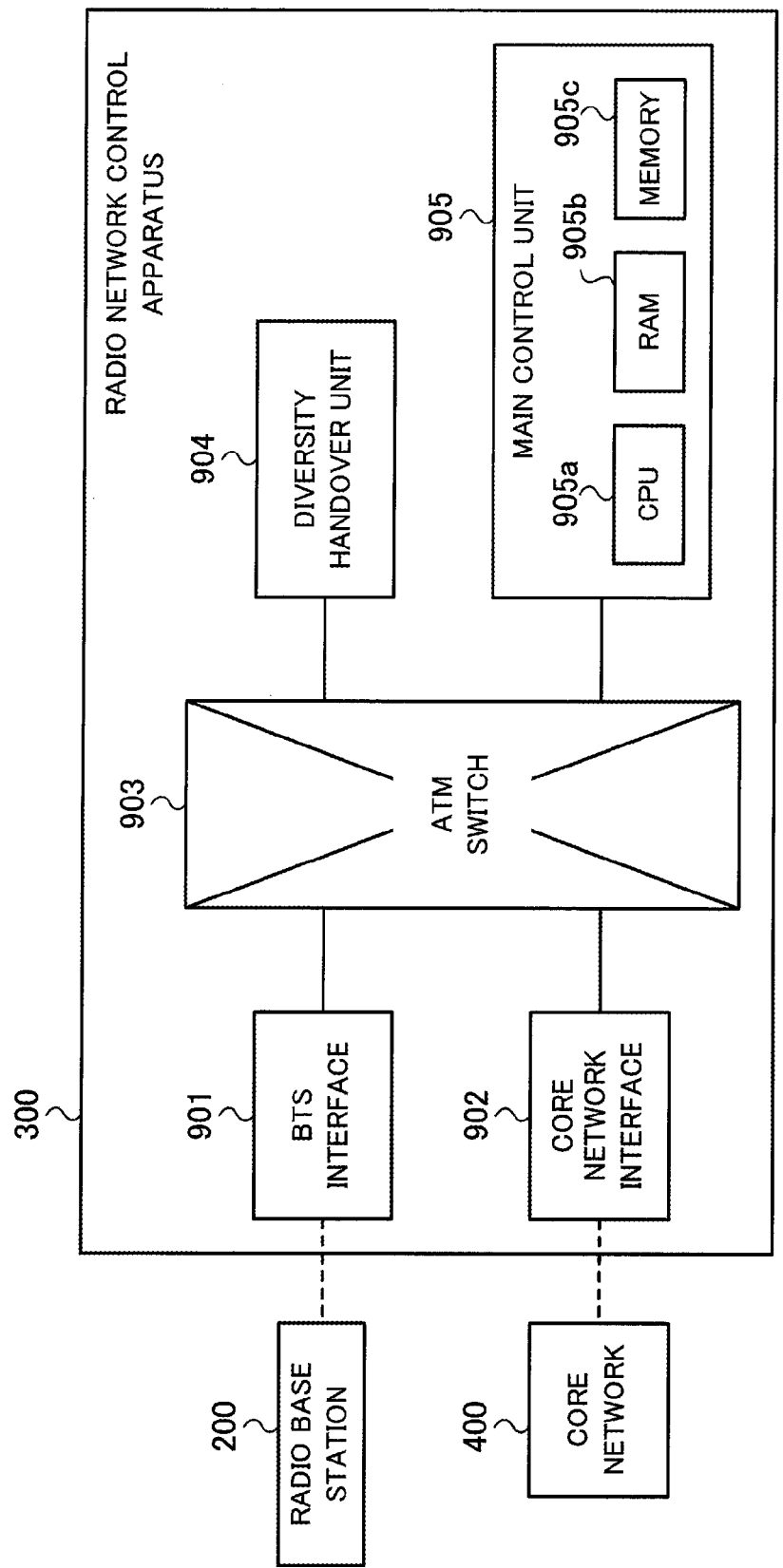
FIG. 5 illustrates an example of the hardware of a radio network control apparatus according to the second embodiment.

Next, the hardware of the radio network control apparatus 300 will be described with reference to FIG. 5. FIG. 5 illustrates an example of the hardware of the radio network control apparatus 300 according to the second embodiment.

As illustrated in FIG. 5, the radio network control apparatus 300 includes a BTS interface 901, a core network interface 902, an asynchronous transfer mode (ATM) switch 903, a diversity handover unit 904, and a main control unit 905.

The BTS interface 901 is a communication interface for exchanging data with the radio base station 200. The core network interface 902 is a communication interface for exchanging data with, for example, the content server 500 via the core network 400. The ATM switch 903 is a switch that transfers, to the diversity handover unit 904 or the main control unit 905, data input from the BTS interface 901 or the core network interface 902, in an asynchronous transfer mode.

The diversity handover unit 904 controls a plurality of radio base stations 200. When the radio terminal apparatus 100 moves between cells during communication, the diversity handover unit 904 establishes a radio channel with a base station 200 of the target cell before releasing a radio channel with a radio base station 200 of the source cell. In other words, the diversity handover unit 904 controls diversity handover.

The main control unit 905 includes a CPU 905a, a RAM 905b, and a memory 905c.

The CPU 905a is a processor including a computing unit that executes instructions described in a program. The CPU 905a loads at least part of programs and data stored in the memory 905c into the RAM 905b, and executes instructions described in the program. The CPU 905a may include a plurality of processor cores. The main control unit 905 may include a plurality of CPUs 905a. In this case, the main control unit 905 is able to execute processes in parallel.

The RAM 905b is a volatile memory that temporarily stores a program executed by the CPU 905a and data used for processing. The memory 905c is an example of a non-volatile storage device that stores programs such as an OS, firmware, and application software, data used for processing, and the like. The main control unit 905 may separately include a storage device such as a flash memory, an SSD, and the like. Further, the main control unit 905 may include a plurality of storage devices.

The above is the description of the hardware of the radio network control apparatus 300.

(Functions of Radio Terminal Apparatus)

Figure 6:
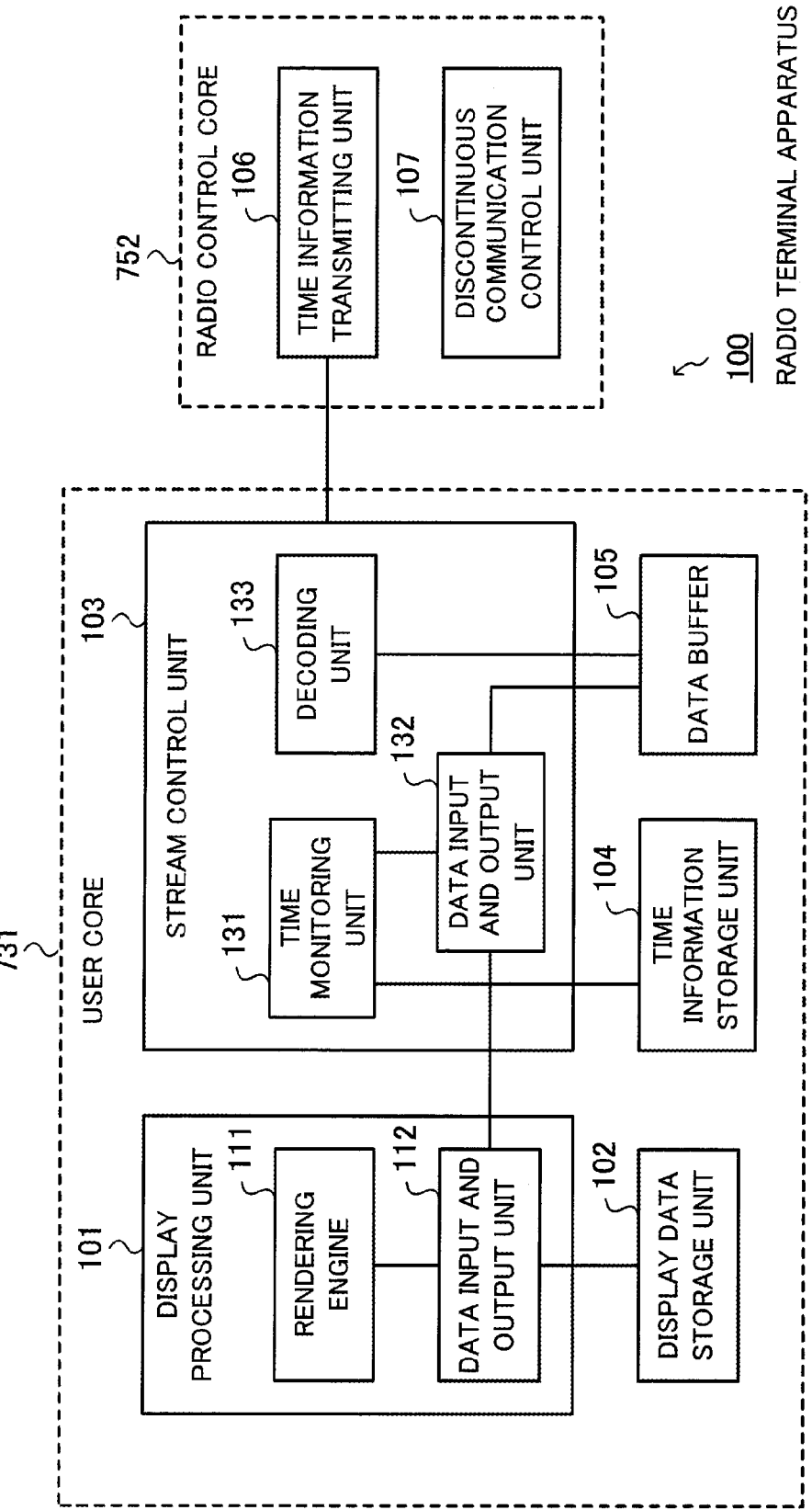
FIG. 6 is a block diagram illustrating examples of functions of the radio terminal apparatus according to the second embodiment.

Next, the functions of the radio terminal apparatus 100 will be described with reference to FIG. 6. FIG. 6 is a block diagram illustrating examples of functions of the radio terminal apparatus 100 according to the second embodiment.

As illustrated in FIG. 6, the radio terminal apparatus 100 includes a display processing unit 101, a display data storage unit 102, a stream control unit 103, a time information storage unit 104, and a data buffer 105. The radio terminal apparatus 100 further includes a time information transmitting unit 106, and a discontinuous communication control unit 107.

Functions of the display processing unit 101, the display data storage unit 102, the stream control unit 103, the time information storage unit 104, and the data buffer 105 may be realized by the user core 731. The functions of the time information transmitting unit 106 and the discontinuous communication control unit 107 may be realized by the radio control core 752.

For example, the functions of the display processing unit 101 and the stream control unit 103 may be implemented as modules of a program executed by the CPU 731a. As the functions of the display processing unit 101 and the stream control unit 103, part of or all the functions of the CPU 731a may be implemented not as software, but as an electronic circuit.

The display data storage unit 102, the time information storage unit 104, and the data buffer 105 are storage areas reserved in the RAM 731b and the memory 731c. The functions of the time information transmitting unit 106 and the discontinuous communication control unit 107 may be implemented as modules of a program executed by the CPU 752a. As the functions of the time information transmitting unit 106 and the discontinuous communication control unit 107, part of or all the functions of the CPU 752a may be implemented not as software, but as an electronic circuit.

(Display Processing Unit 101)

The display processing unit 101 displays display data, such as images, text, and the like, on the display 705. The display processing unit 101 includes a rendering engine 111 and a data input and output unit 112.

The rendering engine 111 generates display data in a form that may be displayed on the display 705, on the basis of data for display including a description language (such as HyperText Markup Language (HTML), Extensible Markup Language (XML), and the like), data structure information, text data, image data, and the like. In other words, the rendering engine 111 performs rendering. The data input and output unit 112 is an input and output unit that stores display data in the display data storage unit 102, and reads the display data from the display data storage unit 102. Also, the data input and output unit 112 exchanges data with the stream control unit 103.

(Display Data Storage Unit 102)

The display data storage unit 102 stores the display data generated by the rendering engine 111. For example, after the rendering engine 111 generates display data, the display data storage unit 102 temporarily stores the display data until the display data is displayed on the display 705. When the display data is read to be displayed on the display 705, the display data is deleted from the display data storage unit 102.

(Stream Control Unit 103)

The stream control unit 103 performs processing for outputting data to the user. The stream control unit 103 includes a time monitoring unit 131, a data input and output unit 132, and a decoding unit 133.

The time monitoring unit 131 generates time information indicating the length of the time period during which the user is viewing or listening to the output contents (for example, images, text, audio, and the like) of the data. For instance, the time monitoring unit 131 measures the time from when the display data becomes ready for display to when the user requests the next display data (to when a data request operation is performed on the touch panel 706 or the keypad 707).

Note that when the time monitoring unit 131 receives, from the display processing unit 101, a notification indicating that reception of image data is completed and confirms that the image data that has been temporality stored in the data buffer 105 is deleted, the time monitoring unit 131 determines this time point as a time point when the display data becomes ready for display.

The time monitoring unit 131 stores the measured time (measurement time) in the time information storage unit 104.

Further, the time monitoring unit 131 calculates the average of the latest measurement time and previous measurement times.

For example, the time monitoring unit 131 extracts a predetermined number of previous measurement times in reverse chronological order, and calculates the average of the extracted previous measurement times and the latest measurement time. In the case where the number of previous measurement times is less than the predetermined number, the time monitoring unit 131 calculates the average of the existing measurement times. The time monitoring unit 131 stores the calculated average in the time information storage unit 104, as time information to be used for discontinuous communication control. The average may be expressed in units of time such as seconds, or may be expressed in units of sub-frames.

The data input and output unit 132 is an input and output unit that exchanges data with the display processing unit 101. For example, the data input and output unit 132 transmits, to the display processing unit 101, image data that is temporarily stored in the data buffer 105. The decoding unit 133 performs decompression and decoding of compressed coded data, image quality enhancement processing on image data, and the like. The decoding unit 133 stores the processed data in the data buffer 105.

(Time Information Storage Unit 104 and Data Buffer 105)

The time information storage unit 104 stores the measurement times measured by the time monitoring unit 131 and the calculated average. The data buffer 105 temporarily stores image data processed by the decoding unit 133. The image data stored in the data buffer 105 is deleted at the point when the image data is read by the display processing unit 101 through the data input and output unit 132.

(Time Information Transmitting Unit 106 and Discontinuous Communication Control Unit 107)

The time information transmitting unit 106 transmits time information held by the stream control unit 103 to the radio network control apparatus 300. The discontinuous communication control unit 107 performs discontinuous transmission on the uplink control channel and discontinuous reception on the downlink control channel.

In the case of the W-CDMA system, the discontinuous communication control unit 107 performs DTX and DRX. In the case of performing DTX, if there is no data transmission on the uplink E-DCH (or if the amount of data is less than a predetermine amount), the discontinuous communication control unit 107 performs control such that DPCCH bursts are discontinuously transmitted. The transmission period of the DPCCH burst is determined by a parameter set by the radio network control apparatus 300. Discontinuous transmission of DPCCH bursts by DTX is referred to as a UE DTX cycle.

In the case of performing DRX, the discontinuous communication control unit 107 performs control such that the downlink HS-SCCH is discontinuously monitored. The monitoring period of the HS-SCCH is determined by a parameter set by the radio network control apparatus 300.

Discontinuous monitoring of the HS-SCCH by DRX is referred to as a UE DRX cycle. DRX is performed in combination with DTX. When the UE DTX cycle starts, the UE DRX cycle also starts. The discontinuous communication control unit 107 controls starting and stopping UE DTX and UE DRX in accordance with a control signal transmitted from the radio network control apparatus 300 on the HS-SCCH.

The above is the functions of the radio terminal apparatus 100.

(Functions of Radio Network Control Apparatus)

Figure 7:
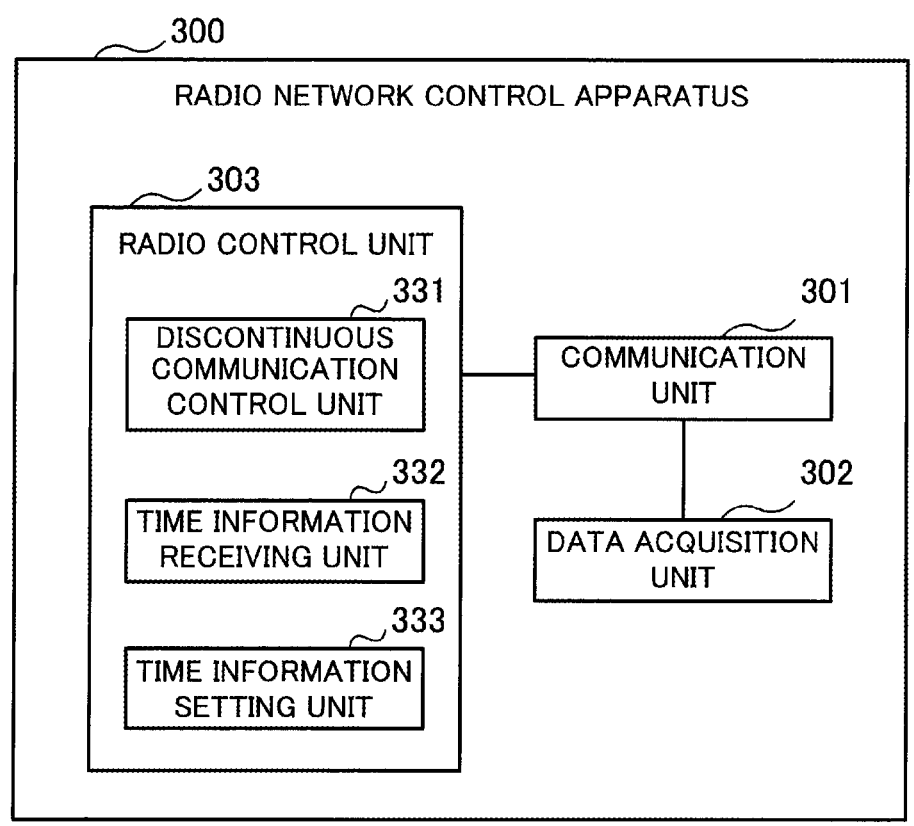
FIG. 7 is a block diagram illustrating examples of functions of the radio network control apparatus according to the second embodiment.

Next, the functions of the radio network control apparatus 300 will be described with reference to FIG. 7. FIG. 7 is a block diagram illustrating examples of functions of the radio network control apparatus 300 according to the second embodiment.

As illustrated in FIG. 7, the radio network control apparatus 300 includes a communication unit 301, a data acquisition unit 302, and a radio control unit 303. The communication unit 301, the data acquisition unit 302, and the radio control unit 303 may be implemented as modules of a program executed by the CPU 905a. Alternatively, part of or all the functions of the communication unit 301, the data acquisition unit 302, and the radio control unit 303 may be implemented not as software, but as an electronic circuit.

(Communication Unit 301)

The communication unit 301 is an interface for communicating with the radio base station 200. For example, the communication unit 301 receives a request for data transmitted from the radio terminal apparatus 100 via the radio base station 200. The communication unit 301 transmits data, which is acquired from the content server 500 by the data acquisition unit 302, to the radio terminal apparatus 100 via the radio base station 200. The communication unit 301 transmits, to the radio base station 200, control information output from the radio control unit 303.

(Data Acquisition Unit 302)

The data acquisition unit 302 acquires data from the content server 500. For example, the data acquisition unit 302 acquires data, such as text data, image data, audio data, and the like, from the content server 500. The data acquisition unit 302 inputs the data acquired from the content server 500 to the communication unit 301 so as to transmit the data to the radio terminal apparatus 100 via the radio base station 200.

(Radio Control Unit 303)

The radio control unit 303 includes a discontinuous communication control unit 331, a time information receiving unit 332, and a time information setting unit 333. The discontinuous communication control unit 331 controls the radio base station 200 so as to perform discontinuous transmission on the uplink control channel and discontinuous reception on the downlink control channel. The time information receiving unit 332 receives time information transmitted from the radio terminal apparatus 100 via the radio base station 200. The time information setting unit 333 sets the periods of the discontinuous transmission and discontinuous reception, on the basis of the time information received by the time information receiving unit 332.

In the case of the W-CDMA system, the time information setting unit 333 sets a parameter that determines the period of the UE DTX cycle and a parameter that determines the period of the UE DRX cycle on the basis of the time information.

The UE DTX cycle includes UE DTX Cycle 1 for transmitting DPCCH bursts at short time intervals and UE DTX Cycle 2 for transmitting DPCCH bursts at long time intervals. The time information setting unit 333 sets a parameter UE_DTX_Cycle_2, which determines the period of UE DTX Cycle 2, to a value based on the time information. Further, the time information setting unit 333 may set a parameter UE_DTX_Cycle_1, which determines the period of UE DTX Cycle 1, to a value based on the time information.

The above is the description of the functions of the radio network control apparatus 300.

(Discontinuous Transmission on Uplink DPCCH)

Figure 8:
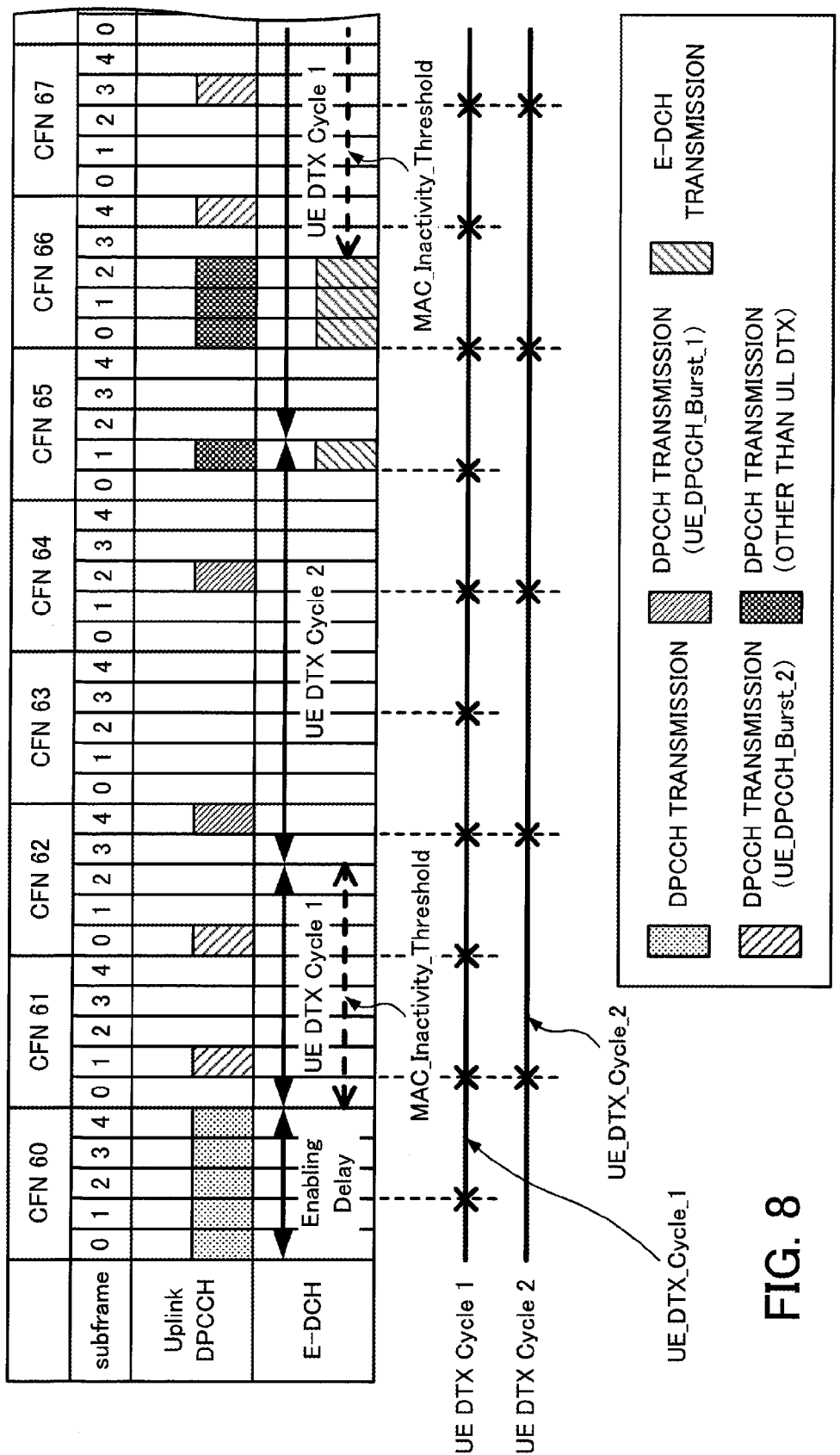
FIG. 8 illustrates discontinuous transmission on an uplink Dedicated Physical Control Channel.

Next, discontinuous transmission on an uplink Dedicated Physical Control Channel (DPCCH) will be described with reference to FIG. 8. FIG. 8 illustrates discontinuous transmission on an uplink DPCCH. In FIG. 8, CFN represents a connection frame number. DPCCH transmission represents a transmission interval of the DPCCH burst (although not illustrated in FIG. 8, a transmission interval of a preamble is present before the DPCCH burst, and a transmission interval of a postamble is present after the DPCCH burst).

The UE DTX cycle (and the UE DRX cycle) is set and activated by a radio resource control (RRC) signal. However, the UE DTX cycle is not activated immediately after a call connection setting is performed, but is activated after an interval called Enabling Delay. The length of the Enabling_Delay interval is determined by a parameter Enabling_Delay (1 frame in the example of FIG. 8). In the Enabling Delay interval, continuous transmission on the uplink DPCCH and continuous reception on the F-DPCH are performed. On the other hand, in the Enabling Delay interval, transmission on the E-DCH is restricted.

After the Enabling Delay interval, the UE DTX cycle is started. The UE DTX cycle includes UE DTX Cycle 1 for transmitting DPCCH bursts at short time intervals and UE DTX Cycle 2 for transmitting DPCCH bursts at long time intervals.

The transmission period of the DPCCH burst in the interval of UE DTX Cycle 1 is determined by the parameter UE_DTX_Cycle_1 (4 sub-frames in the example of FIG. 8). The transmission period of the DPCCH burst in the interval of UE DTX Cycle 2 is determined by the parameter UE_DTX_Cycle_2 (8 sub-frames in the example of FIG. 8).

UE_DTX_Cycle_2 is often set to an integer multiple of UE_DTX_Cycle_1. The length of the transmission interval of the DPCCH burst in UE DTX Cycle is determined by a parameter UE_DPCCH_Burst_1. The length of the transmission interval of the DPCCH burst in UE DTX Cycle 2 is determined by a parameter UE_DPCCH_Burst_2.

After the Enabling Delay interval, UE DTX Cycle 1 is started. If there is no E-DCH transmission for a predetermined time period in UE DTX Cycle 1, the radio terminal apparatus 100 switches the UE DTX cycle to UE DTX Cycle 2. The length of the predetermined time period is determined by a parameter MAC_Inactivity_Threshold (8 sub-frames in the example of FIG. 8).

If transmission on the E-DCH occurs (at CFN 65, Sub-frame 1 in the example of FIG. 8) in the interval of UE DTX Cycle 2, the radio terminal apparatus 100 transmits the DPCCH in the transmission time interval (TTI) in which transmission on the E-DCH occurs. Further, the radio terminal apparatus 100 switches the UE DTX cycle from UE DTX Cycle 2 to UE DTX Cycle 1 in a TTI after the transmission on the E-DCH.

If transmission on the E-DCH occurs in the interval of UE DTX Cycle 1, the radio terminal apparatus 100 immediately transmits the DPCCH. If there is no E-DCH transmission for a time period determined by MAC_Inactivity_Threshold, the radio terminal apparatus 100 switches the UE DTX cycle to UE DTX Cycle 2 again.

As mentioned above, the discontinuous transmission period of the DPCCH burst is determined by the parameters UE_DTX_Cycle_1 and UE_DTX_Cycle_2. Accordingly, it is possible to adjust the interval for transmitting the DPCCH burst by controlling the parameters UE_DTX_Cycle_1 and UE_DTX_Cycle_2.

The above is the description of discontinuous transmission on the uplink DPCCH.

(Discontinuous Reception on Downlink HS-SCCH)

Figure 9:
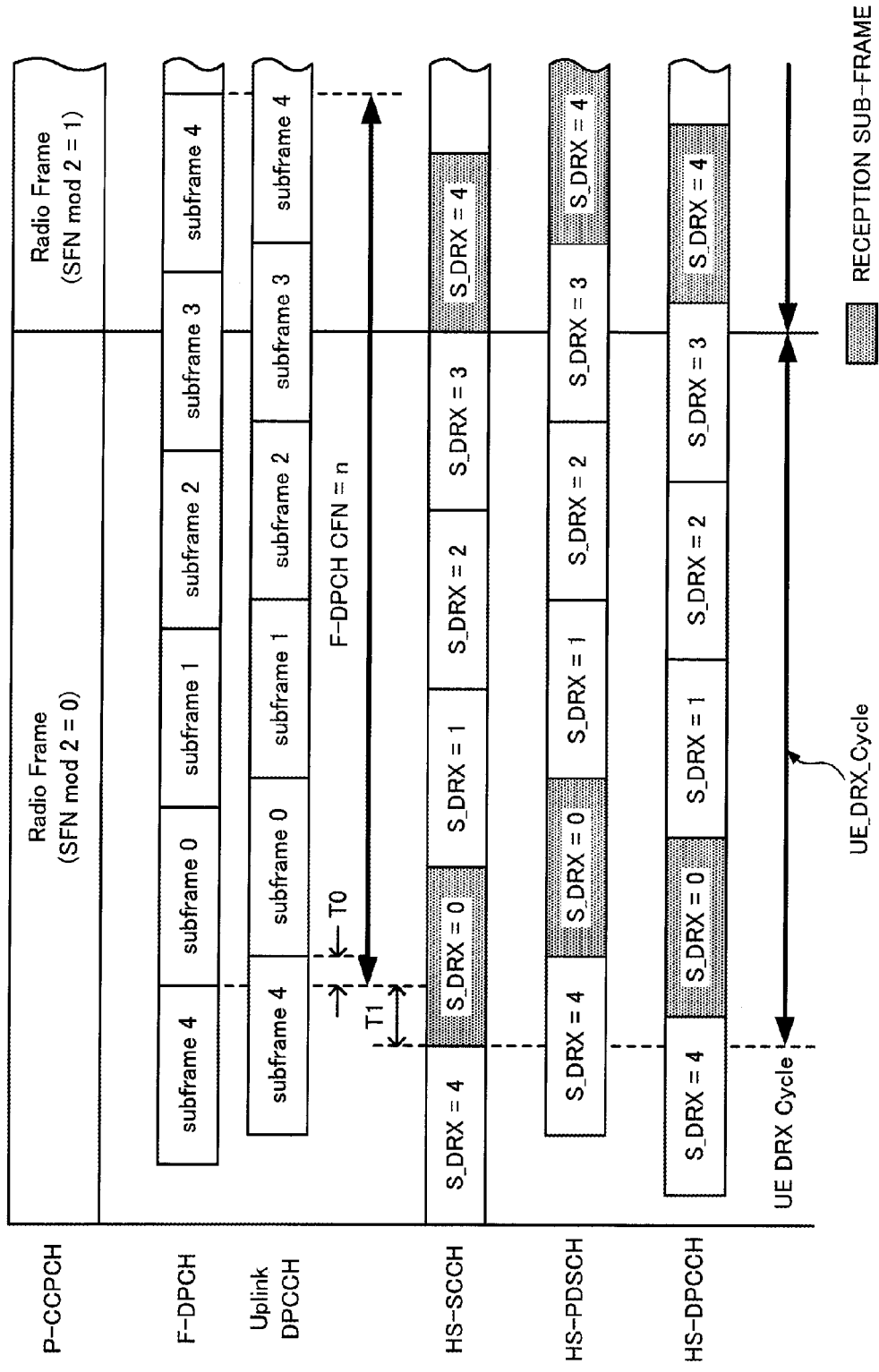
FIG. 9 illustrates discontinuous reception on a downlink High-Speed Shared Control Channel.

Next, discontinuous reception on a downlink High-Speed Shared Control Channel (HS-SCCH) will be described with reference to FIG. 9. FIG. 9 illustrates discontinuous reception on a downlink HS-SCCH. In FIG. 9, P-CCPCH is an example of a broadcast channel. SFN represents a sub-frame number. S_DRX represents a sub-frame number.

In the UE DRX cycle, the radio terminal apparatus 100 receives part of the HS-SCCH, HS-PDSCH, and HS-DPCCH (sub-frames indicated by hatching (reception sub-frames) in the example of FIG. 9). The time interval for receiving reception sub-frames on the HS-SCCH is determined by a parameter UE_DRX_Cycle. The reception timings of reception sub-frames on the HS-PDSCH and HS-DPCCH are determined in accordance with the reception timing of reception sub-frames on the HS-SCCH.

The radio terminal apparatus 100 starts reception in the UE DRX cycle, starting with reception sub-frames of the HS-SCCH, within a predetermined time period before and after the F-DPCH having a certain number (CFN=n in the example of FIG. 9) is started. This predetermined time period is determined by time T0 and time T1 illustrated in FIG. 9. After a lapse of a predetermined time period from the start of the discontinuous reception of the HS-SCCH in the UE DRX cycle, the radio terminal apparatus 100 starts discontinuous reception of the HS-PDSCH and HS-DPCCH. Referring to the sub-frame number S_DRX of the HS-DPCCH, the top sub-frame (S_DRX=0) of the HS-DPCCH is set to a position corresponding to the position of the top sub-frame of the HS-PDSCH.

The above is the description of discontinuous reception on the downlink HS-SCCH.

(Examples of Parameters)

Next, examples of parameters used for discontinuous transmission on the uplink DPCCH and discontinuous reception on the downlink HS-SCCH will be described with reference to FIG. 10. FIG. 10 illustrates examples of parameters used for discontinuous transmission on the uplink DPCCH and discontinuous reception on the HS-SCCH.

For discontinuous transmission on the uplink DPCCH, parameters such as UE_DTX_Cycle_1, UE_DTX_Cycle_2, MAC_Inactivity_Threshold, and the like are used. UE_DTX_Cycle_1 is a parameter that determines the discontinuous transmission period of UE DTX Cycle 1.

In UE DTX Cycle 1, DPCCH bursts are transmitted at time intervals indicated by UE_DTX_Cycle_1. The length of the DPCCH burst in UE DTX Cycle 1 is determined by the parameter UE_DPCCH_Burst_1. As illustrated in FIG. 10, the value of UE_DTX_Cycle_1 is given in units of sub-frames, in accordance with the E-DCH TTI.

UE_DTX_Cycle_2 is a parameter that determines the discontinuous transmission period of UE DTX Cycle 2. In UE DTX Cycle 2, DPCCH bursts are transmitted at time intervals indicated by UE_DTX_Cycle_2. The length of the DPCCH burst in UE DTX Cycle 2 is determined by the parameter UE_DPCCH_Burst_2. Similar to UE_DTX_Cycle_1, the value of UE_DTX_Cycle_2 is given in units of sub-frames, in accordance with the E-DCH TTI.

MAC_Inactivity_Threshold is a parameter which is referred to when UE DTX Cycle 1 is switched to UE DTX Cycle 2.

If there is no E-DCH transmission for a time period determined by MAC_Inactivity_Threshold in UE DTX Cycle 1, the radio terminal apparatus 100 switches the UE DTX cycle to UE DTX Cycle 2. The value of MAC_Inactivity_Threshold is given in units of E-DCH TTIs. Note that when the value of MAC_Inactivity_Threshold is set to infinity, it is possible to operate only with UE DTX Cycle 1.

For discontinuous reception on the downlink HS-SCCH, parameters such as UE_DRX_Cycle and the like are used. Although not described herein, parameters such as those indicating predetermined time periods for determining the timings for staring discontinuous reception on the HS-SCCH, HS-PDSCH, and HS-DPCCH are also used for discontinuous reception on the downlink HS-SCCH, for example. UE_DRX_Cycle determines the time interval for receiving reception sub-frames on the HS-SCCH. The value of UE_DRX_Cycle is given in units of sub-frames.

The setting values illustrated in the example of FIG. 10 are prescribed values that are usually used in the W-CDMA system. In the second embodiment, the radio network control apparatus 300 adjusts at least one of UE_DTX_Cycle_1, UE_DTX_Cycle_2, and UE_DRX_Cycle for each radio terminal apparatus 100. More specifically, the radio network control apparatus 300 adjusts at least one of UE_DTX_Cycle_1, UE_DTX_Cycle_2, and UE_DRX_Cycle to a value corresponding to the time information transmitted from the radio terminal apparatus 100.

The above is the description of examples of parameters used for discontinuous transmission on the uplink DPCCH and discontinuous reception on the downlink HS-SCCH.

(Example of Data Unit)

Figure 11:
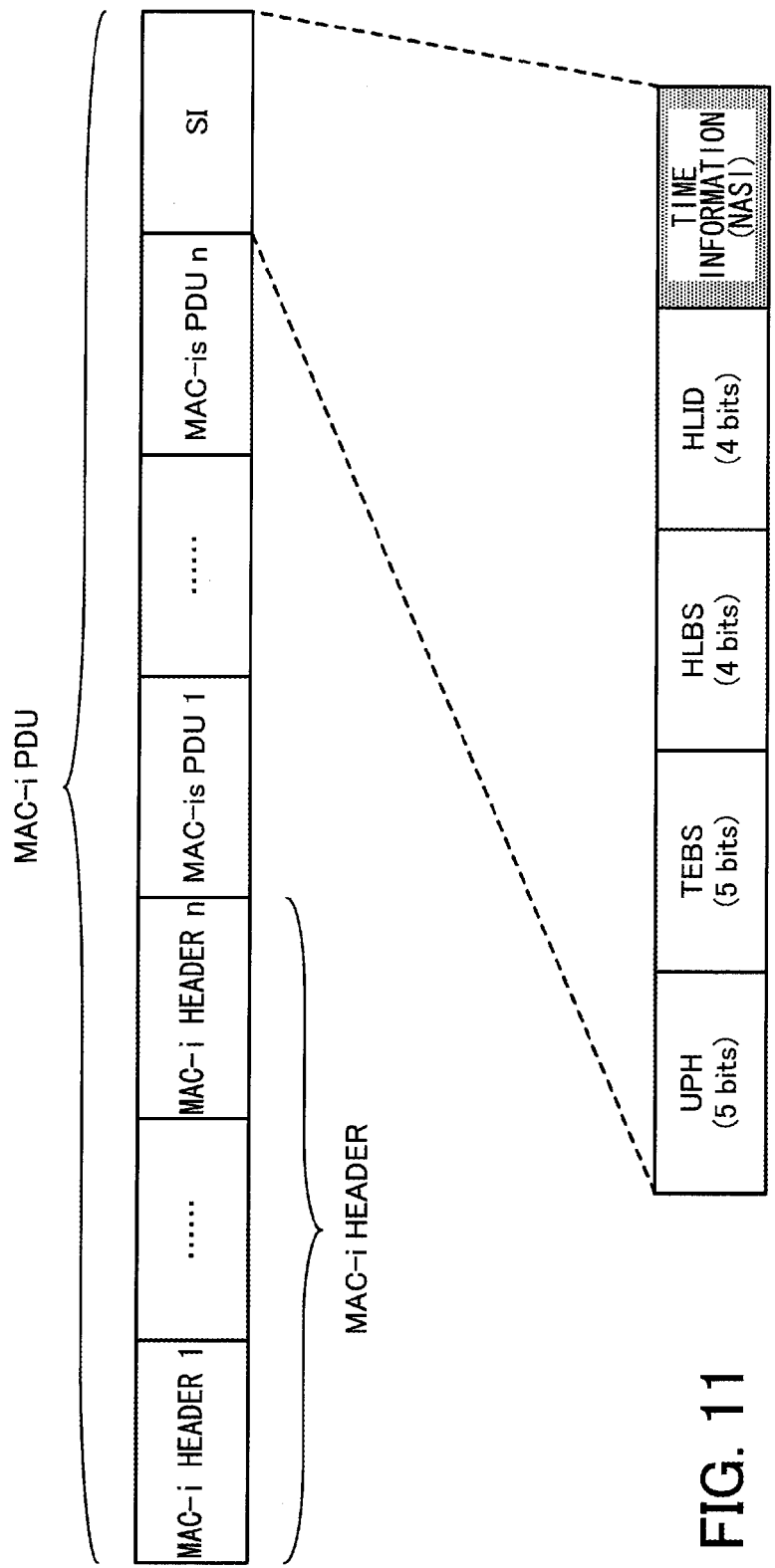
FIG. 11 is a first diagram illustrating an example of a data unit transmitted on an Enhanced Dedicated Channel.
Figure 12:
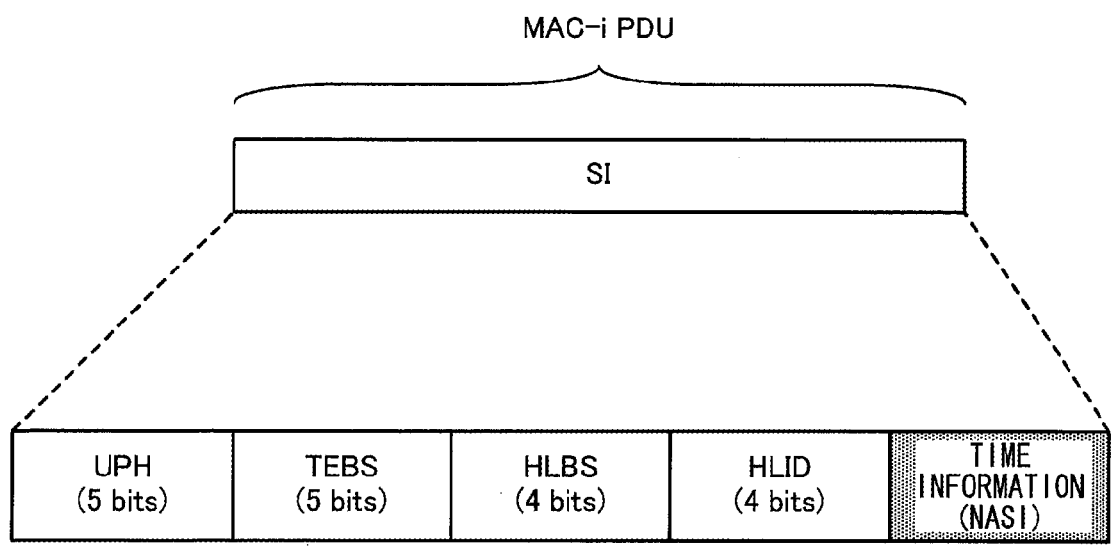
FIG. 12 is a second diagram illustrating an example of a data unit transmitted on an Enhanced Dedicated Channel.

Next, a protocol data unit (PDU) used for E-DCH transmission will be described with reference to FIGS. 11 and 12. FIG. 11 is a first diagram illustrating an example of a data unit transmitted on the E-DCH. FIG. 12 is a second diagram illustrating an example of a data unit transmitted on the E-DCH. In FIGS. 11 and 12, a MAC PDU format of MAC-i/is illustrated as an example. However, a MAC PDU format of MAC-e/es may also be applicable to the technique of the second embodiment.

As illustrated in FIG. 11, a MAC-i PDU contains MAC-i headers and MAC-is PDUs. The same number of MAC-i headers as the number of MAC-is PDUs contained in the MAC-i PDU are generated, and are added to the MAC-i PDU. The MAC-i PDU also contains a scheduling information (SI) message.

The SI message contains a UE power headroom (UPH) field and a total E-DCH buffer status (TEBS) field. The SI message also contains a highest priority logical buffer status (HLBS) field and a highest priority logical channel ID (HLID) field. Note that the top bit of the UPH field is the most significant bit (MSB).

The UPH field contains a 5-bit indicator indicating the ratio of the maximum transmission power of the radio terminal apparatus 100 and the corresponding DPCCH code power. The TEBS field contains a 5-bit identifier that identifies the total amount of data available across all logical channels. The identifier contained in the TEBS field identifies the amount of data in bytes that is available for transmission and retransmission at a radio link control (RLC).

The HLBS field contains an indicator that indicates the ratio of the amount of data available from the highest priority logical channel. The HLID field contains a 4-bit identifier that identifies the highest priority logical channel (a logical channel that occupies the greatest amount of buffer resources).

The SI message of the second embodiment also contains a non access span information (NASI) field. The NASI field contains a 4-bit identifier that identifies the time information to be transmitted from the radio terminal apparatus 100 to the radio network control apparatus 300. In an alternative example, as illustrated in FIG. 12, a MAC-i PDU may be formed with an SI message, and the SI message may contain a NASI field.

The above is the description of the PDU used for E-DCH transmission.

(Method of Generating Time Information)

Next, a description will be given of a method of generating time information to be contained in a PDU and transmitted from the radio terminal apparatus 100 to the radio network control apparatus 300 so as to adjust the periods of the UE DTX cycle and UE DRX cycle, with reference to FIG. 13. FIG. 13 illustrates an example of a method of generating time information according to the second embodiment.

The time information generated herein indicates the length of the time period during which the user is viewing or listening to the output results of data after the data becomes ready for output in the radio terminal apparatus 100. For example, the time information indicates the length of the time period during which the user is browsing web sites so as to view videos and pictures, listen to audio and music, or to read text. During this time period, processing related to image data (decoding, image quality enhancement processing, and the like), reception of image data, and the like are rarely performed, for instance. In view of this, in the second embodiment, a method is proposed that adjusts the periods of the UE DTX cycle and UE DRX cycle using the time information indicating the length of this time period.

The time information is generated using a function of the stream control unit 103 of the radio terminal apparatus 100. The following is an example of a method of generating time information when image data is received. When image data is received, the decoding unit 133 performs decoding, image quality enhancement processing, and the like, and stores the processed image data in the data buffer 105. The display processing unit 101 reads the image data through the data input and output unit 132. Thus, an image is displayed on the display 705 by the display processing unit 101.

Upon completion of reception of the image data from the stream control unit 103, the display processing unit 101 notifies the stream control unit 103 of completion of the reception of the image data. The display processing unit 101 generates display data by causing the rendering engine 111 to render the image data, and temporarily stores the rendered image data in the display data storage unit 102. Then, the display processing unit 101 reads the display data from the display data storage unit 102, and displays the display data on the display 705. After reading the display data, the display processing unit 101 deletes the read display data from the display data storage unit 102.

When the time monitoring unit 131 confirms that the stream control unit 103 has received the reception completion notification from the display processing unit 101 and that no data is stored in the data buffer 105, the time monitoring unit 131 starts the timer. The timer is a timing device that measures the time from when the timer is started and to when the timer is stopped. When the user requests the next image data (when an operation requesting image data is performed on the touch panel 706 or the keypad 707), the time monitoring unit 131 stops the timer. Then, the time monitoring unit 131 stores a record indicating the time (measurement time) from when the timer is started to when the timer is stopped, in the time information storage unit 104. Further, the time monitoring unit 131 calculates the average of the previously measured measurement times and the currently measured measurement time. The time monitoring unit 131 calculates the average using a method illustrated in FIG. 13.

For example, if the current measurement is an N-th measurement, the time monitoring unit 131 reads a predetermined number of records of previous measurement times from the time information storage unit 104. In the example of FIG. 13, four records of previous measurement times are read in reverse chronological order. The time monitoring unit 131 calculates the average measurement time using the records read from the time information storage unit 104.

For example, if an N-th measurement time is 12.235 seconds; an (N−1)th measurement time is 80.095 seconds; an (N−2)th measurement time is 1.367 seconds; an (N−3)th measurement time is 9.345 seconds; and an (N−4)th measurement time is 15.123 seconds, the average is 23.633 seconds. The time monitoring unit 131 generates time information (corresponding to 50 sub-frames in the example of FIG. 13) on the basis of the average. Note that the time information may be converted into units of sub-frames.

The above is the description of the method of generating time information.

(Method of Using Time Information)

Next, a description will be given of a method how the radio network control apparatus 300 uses time information upon adjusting the periods of the UE DTX cycle and UE DRX cycle, with reference to FIG. 14. FIG. 14 illustrates an example of a method of using time information according to the second embodiment.

The time information setting unit 333 converts the value of time information expressed in units of seconds or the like into units of sub-frames or the like (the same units as those of UE_DTX_Cycle_1, UE_DTX_Cycle_2, and UE_DRX_Cycle). The value of time information may be directly converted into units of sub-frames or the like on the basis of the length of the E-DCH TTI. In the second embodiment, however, a method of converting time information using determination conditions illustrated in FIG. 14 is proposed.

According to the method of FIG. 14, q+1 thresholds Th(0), . . . , and Th(q) (T(0)>T(1)> . . . >T(q−1)>T(q)) are prepared. A value is assigned to each of ranges defined by two adjacent thresholds. Then, a determination is made as to which range the value of time information falls in. Thus, a value assigned to the range in which the value of the time information is determined to fall is selected.

Information of a table for associating determination conditions with converted values may be stored in advance in the time information setting unit 333. The time information setting unit 333 refers to the table and selects a value assigned to the range in which the value indicated by the time information falls. Note that a "PRESCRIBED VALUE" in the table of FIG. 14 indicates a prescribed value (examples of parameters illustrated in FIG. 10) that is usually used in the W-CDMA system, for example.

The above is the description of the method of using time information.

The value of time information selected in the manner described above is set as the discontinuous communication period of the UE DTX cycle or the UE DRX cycle. The value set as the discontinuous communication period is transmitted from the radio network control apparatus 300 to the radio terminal apparatus 100 as a CPC parameter, when CPC is started.

(Processing for Starting CPC Control)

Figure 15:
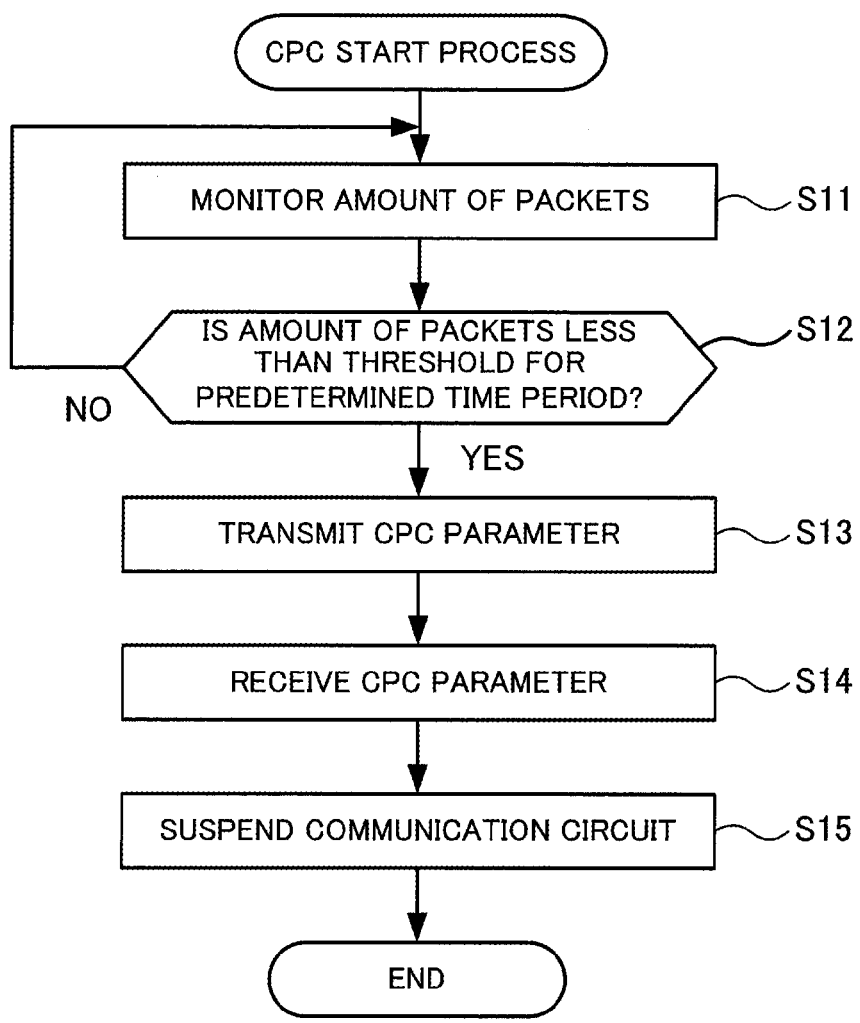
FIG. 15 illustrates operations performed by the radio network control apparatus and the radio terminal apparatus when starting CPC control.

The following describes operations performed by the radio network control apparatus 300 and the radio terminal apparatus 100 when starting CPC control, with reference to FIG. 15. FIG. 15 illustrates operations performed by the radio network control apparatus 300 and the radio terminal apparatus 100 when starting CPC control. Note that operations in steps S11 through S13 are performed by the radio network control apparatus 300. Operations in steps S14 and S15 are performed by the radio terminal apparatus 100.

(S11) The radio network control apparatus 300 monitors the amount of data packets transmitted from the radio terminal apparatus 100.

(S12) The radio network control apparatus 300 determines whether the monitored amount of packets is less than a threshold for a predetermined time period. If the amount of packets is less than the threshold for a predetermined time period, the process proceeds to step S13. If the amount of packets is greater than the threshold, the process returns to step S11. The determination condition may be changed such that the process proceeds to step S13 if the amount of packets is zero for a predetermined time period.

(S13) The radio network control apparatus 300 transmits, to the radio terminal apparatus 100, a CPC parameter that is set on the basis of time information.

(S14) The radio terminal apparatus 100 receives the CPC parameter transmitted from the radio network control apparatus 300.

(S15) The radio terminal apparatus 100 suspends part of or the entire transmission system and reception system circuits in the baseband unit 702 in accordance with the received CPC parameter.

The above is the processing for starting CPC control.

(Operations of Radio Terminal Apparatus)

Next, operations of the radio terminal apparatus 100 will be described with reference to FIGS. 16 through 18. Note that the following describes operations of the radio terminal apparatus 100, and particularly describes operations of the display processing unit 101, the stream control unit 103, and the radio control core 752.

Figure 16:
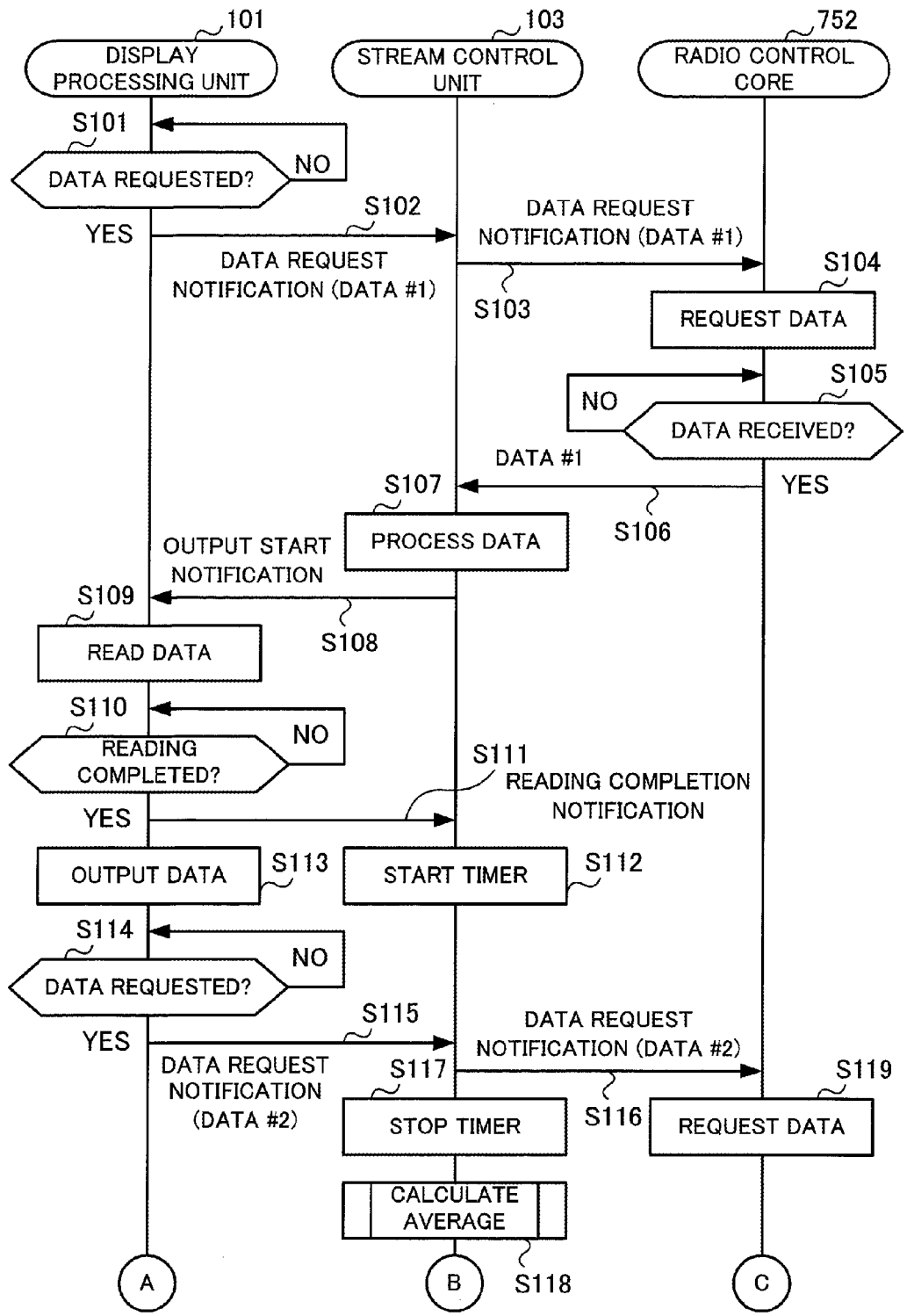
FIG. 16 is a first diagram illustrating exemplary operations performed by the radio terminal apparatus when carrying out discontinuous transmission and reception control according to the second embodiment.

Referring first to FIG. 16, there is illustrated a first diagram of exemplary operations performed by the radio terminal apparatus 100 when carrying out discontinuous transmission and reception control according to the second embodiment.

(S101) The display processing unit 101 determines whether data is requested by the user. If the display processing unit 101 determines that data is requested by the user, the process proceeds to step S102. On the other hand, if data is not requested by the user, the display processing unit 101 waits until data is requested by the user.

(S102) Upon receiving the data request, the display processing unit 101 inputs, to the stream control unit 103, a data request notification requesting the radio network control apparatus 300 for data (data #1) that is requested by the user.

(S103) Upon receiving the data request notification requesting the data #1, the stream control unit 103 transfers the data request notification requesting the data #1 to the radio control core 752.

(S104) Upon receiving the data request notification requesting the data #1, the radio control core 752 requests the radio network control apparatus 300 for the data #1. The radio control core 752 transmits a request signal requesting the data #1 to the radio network control apparatus 300 via the radio base station 200 by radio.

(S105) The radio control core 752 determines whether the data #1 is received from the radio network control apparatus 300. If the radio control core 752 determines that the data #1 that is transmitted from the radio network control apparatus 300 via the radio base station 200 by radio is received, the process proceeds to step S106. On the other hand, if the data #1 is not received, the radio control core 752 waits for reception of the data #1.

(S106) The radio control core 752 inputs the received data #1 to the stream control unit 103.

(S107) Upon receiving the data #1, the stream control unit 103 performs predetermined processing on the data #1. For example, if the data #1 is image data, the stream control unit 103 performs decoding, image quality enhancement processing, and the like, on the data #1. After completion of the predetermined processing, the stream control unit 103 stores the data #1 subjected to the predetermined processing in the data buffer 105. Then, the process proceeds to step S108.

(S108) The stream control unit 103 inputs, to the display processing unit 101, an output start notification for starting output of the data #1.

(S109, S110) Upon receiving the output start notification of the data #1, the display processing unit 101 reads the data #1 from the data buffer 105. The display processing unit 101 determines whether the reading of the data #1 is completed. If the display processing unit 101 determines that the reading of the data #1 is completed, the process proceeds to step S111.

(S111) Upon completion of the reading of the data #1, the display processing unit 101 inputs, to the stream control unit 103, a reading completion notification for notifying completion of the reading of the data #1.

(S112) Upon receiving the reading completion notification, the stream control unit 103 confirms that the data buffer 105 is empty, and then starts the timer. The timer is a timing device that measures the time from when the timer is started to when the timer is stopped.

(S113) After inputting the reading completion notification to the stream control unit 103 in step S111, the display processing unit 101 outputs the data #1. If the data #1 is display data such as image data and text data, the display processing unit 101 displays the data #1 on the display 705. If the data #1 is audio data, the display processing unit 101 outputs the data #1 using an audio output device such as the speaker 709 or the like.

(S114) The display processing unit 101 determines again whether data is requested by the user. In the example of FIG. 16, a determination as to whether data is requested is made after the data is output in step S113. However, a determination as to whether data is requested may be made during output of the data. If the display processing unit 101 determines that data is requested by the user, the process proceeds to step S115. On the other hand, if data is not requested by the user, the display processing unit 101 waits until data is requested by the user.

(S115) Upon receiving the data request, the display processing unit 101 inputs, to the stream control unit 103, a data request notification requesting the radio network control apparatus 300 for data (data #2) that is requested by the user.

(S116) Upon receiving the data request notification requesting the data #2, the stream control unit 103 transfers the data request notification requesting the data #2 to the radio control core 752.

(S117) Upon receiving the data request notification requesting the data #2, the stream control unit 103 stops the timer. The stream control unit 103 stores a record indicating the time (measurement time) from when the timer is started to when the timer is stopped, in the time information storage unit 104.

(S118) After storing, in the time information storage unit 104, the record of the measurement time (hereinafter referred to as a measurement time #1) measured after reception of the data #1, the stream control unit 103 determines whether a record indicating a previously measured measurement time is stored in the time information storage unit 104.

If there is a record of a previously measured measurement time, the stream control unit 103 calculates the average of the measurement time #1 and the previously measured measurement time. The stream control unit 103 generates time information on the basis of the calculated average measurement time, and stores the time information in the time information storage unit 104. In this step, it is assumed that a record of a previously measured measurement time is not stored in the time information storage unit 104. Thus, the stream control unit 103 stores the measurement time #1 as time information.

(S119) Upon receiving the data request notification requesting the data #2 that is input from the stream control unit 103 in step s116, the radio control core 752 requests the radio network control apparatus 300 for the data #2. The radio control core 752 transmits a request signal requesting the data #2 to the radio network control apparatus 300 via the radio base station 200 by radio.

Figure 17:
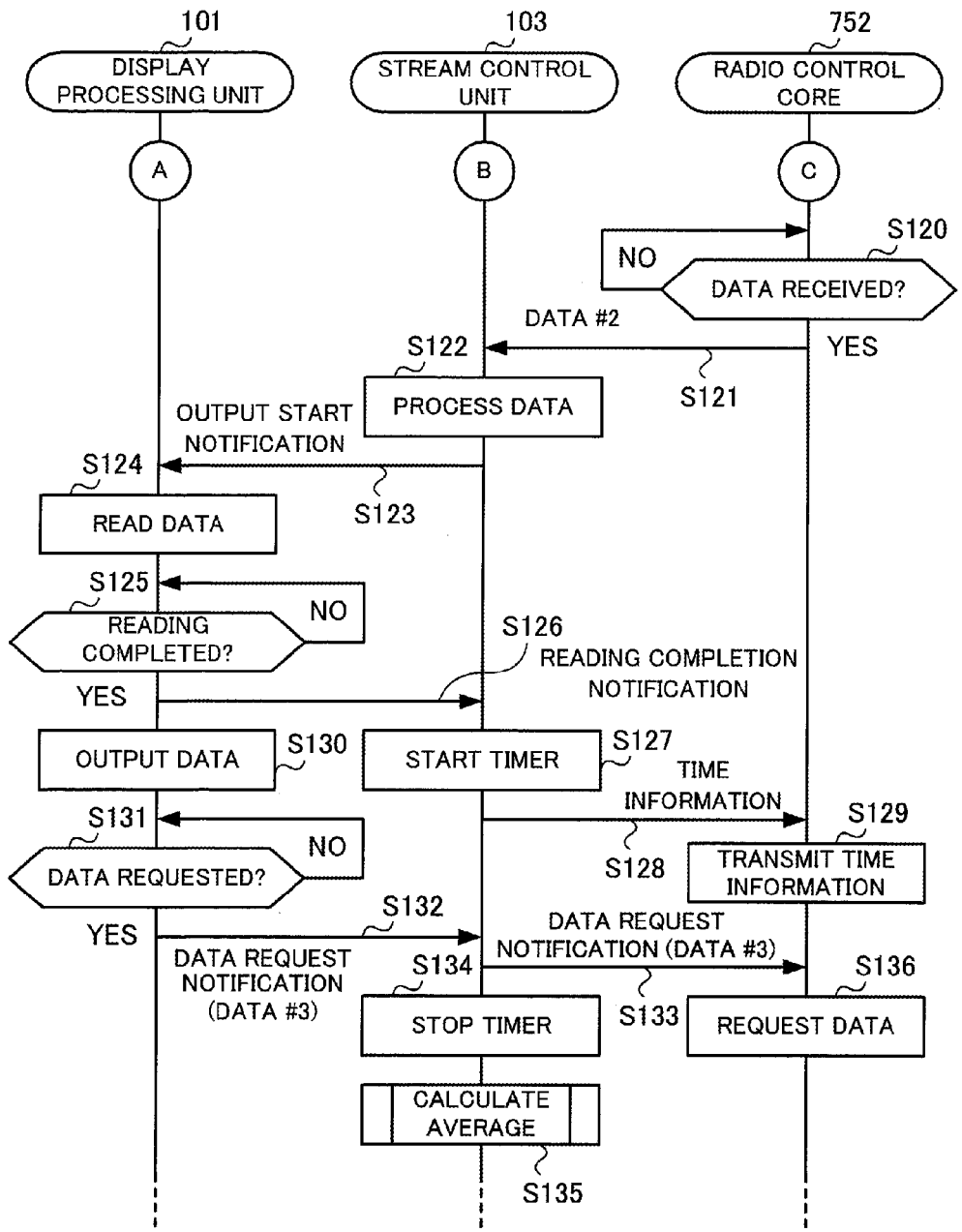
FIG. 17 is a second diagram illustrating exemplary operations performed by the radio terminal apparatus when carrying out discontinuous transmission and reception control according to the second embodiment.
Figure 18:
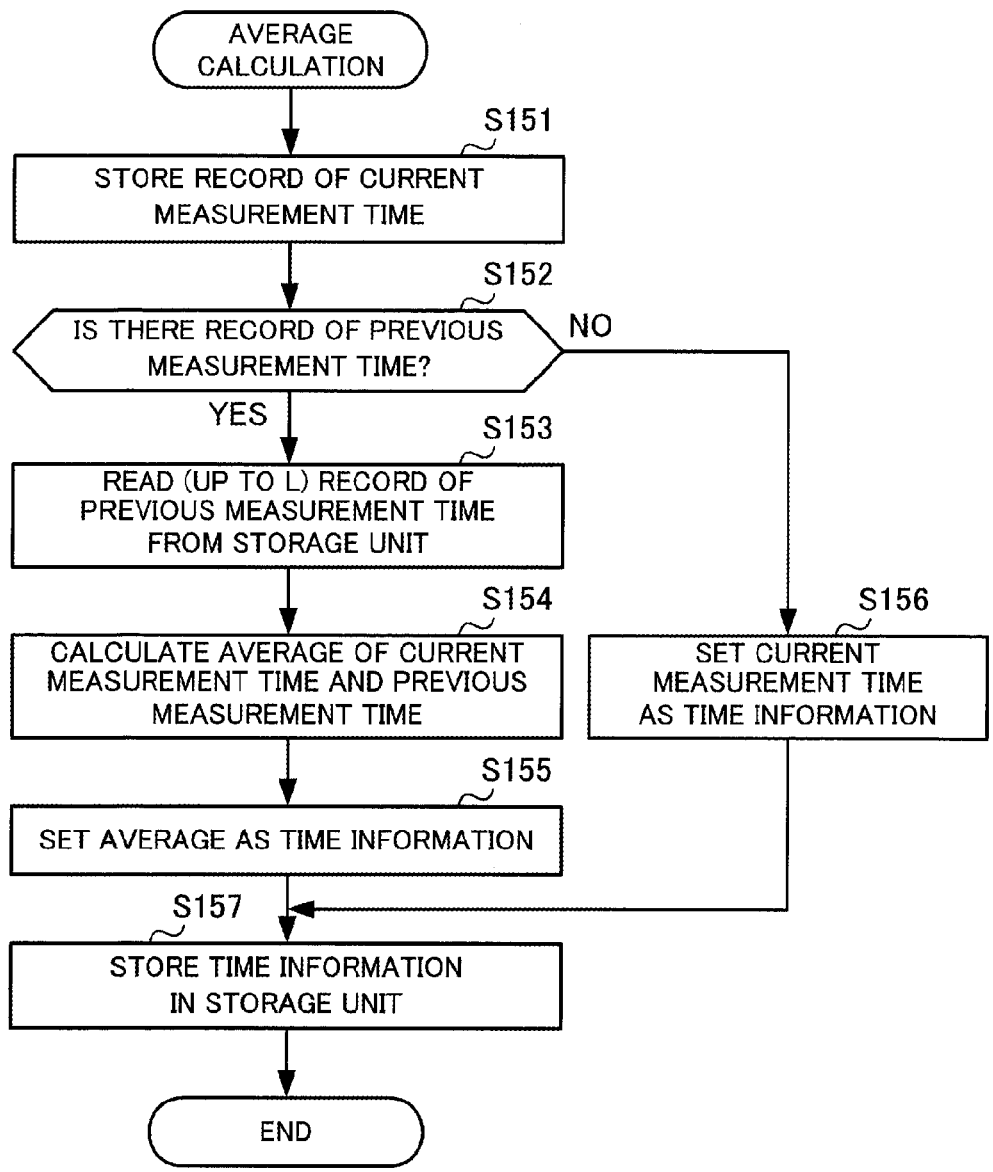
FIG. 18 illustrates exemplary operations performed by the radio terminal apparatus when calculating an average according to the second embodiment.

Referring next to FIG. 17, there is illustrated a second diagram of exemplary operations performed by the radio terminal apparatus 100 when carrying out discontinuous transmission and reception control according to the second embodiment.

(S120) The radio control core 752 determines whether the data #2 is received from the radio network control apparatus 300. If the radio control core 752 determines that the data #2 transmitted from the radio network control apparatus 300 via the radio base station 200 by radio is received, the process proceeds to step S121. On the other hand, if the data #2 is not received, the radio control core 752 waits for reception of the data #2.

(S121) The radio control core 752 inputs the received data #2 to the stream control unit 103.

(S122) Upon receiving the data #2, the stream control unit 103 performs predetermined processing on the data #2. For example, if the data #2 is image data, the stream control unit 103 performs decoding, image quality enhancement processing, and the like, on the data #2. After completion of the predetermined processing, the stream control unit 103 stores the data #2 subjected to the predetermined processing in the data buffer 105. Then, the process proceeds to step S123.

(S123) The stream control unit 103 inputs, to the display processing unit 101, an output start notification for starting output of the data #2.

(S124, S125) Upon receiving the output start notification of the data #2, the display processing unit 101 reads the data #2 from the data buffer 105. The display processing unit 101 determines whether the reading of the data #2 is completed. If the display processing unit 101 determines that the reading of the data #2 is completed, the process proceeds to step S126.

(S126) Upon completion of the reading of the data #2, the display processing unit 101 inputs, to the stream control unit 103, a reading completion notification for notifying completion of the reading of the data #2.

(S127) Upon receiving the reading completion notification, the stream control unit 103 confirms that the data buffer 105 is empty, and then starts the timer.

(S128) Upon starting the timer, the stream control unit 103 reads the time information (measurement time #1) stored in the time information storage unit 104, and inputs the read time information to the radio control core 752.

(S129) Upon receiving the time information, the radio control core 752 transmits the time information to the radio network control apparatus 300.

For example, the radio control core 752 inserts the time information into an SI field of a MA-i PDU, and transmits the time information to the radio network control apparatus 300 on the E-DPDCH. When the time information is transmitted to the radio network control apparatus 300 in this way, the radio network control apparatus 300 becomes able to set parameters that determine the periods of the UE DTX cycle and UE DRX cycle on the basis of the time information.

(S130) After inputting the reading completion notification to the stream control unit 103 in step S126, the display processing unit 101 outputs the data #2. If the data #2 is display data such as image data and text data, the display processing unit 101 displays the data #2 on the display 705. If the data #2 is audio data, the audio output device such as the speaker 709 or the like.

(S131) The display processing unit 101 determines again whether data is requested by the user. In the example of FIG. 17, a determination as to whether data is requested is made after the data is output in step S130. However, a determination as to whether data is requested may be made during output of the data. If the display processing unit 101 determines that data is requested by the user, the process proceeds to step S132. On the other hand, if data is not requested by the user, the display processing unit 101 waits until data is requested by the user.

(S132) Upon receiving the data request, the display processing unit 101 inputs, to the stream control unit 103, a data request notification requesting the radio network control apparatus 300 for data (data #3) that is requested by the user.

(S133) Upon receiving the data request notification requesting the data #3, the stream control unit 103 transfers the data request notification requesting the data #3 to the radio control core 752.

(S134) Upon receiving the data request notification requesting the data #3, the stream control unit 103 stops the timer. The stream control unit 103 stores a record indicating the time (measurement time) from when the timer is started to when the timer is stopped, in the time information storage unit 104.

(S135) After storing, in the time information storage unit 104, the record of the measurement time (hereinafter referred to as a measurement time #2) measured after reception of the data #2, the stream control unit 103 determines whether a record indicating a previously measured measurement time is stored in the time information storage unit 104.

If there is a record of a previously measured measurement time, the stream control unit 103 calculates the average of the measurement time #2 and the previously measured measurement time. In this step, since the record of the measurement time #1 is already stored in the time information storage unit 104, the stream control unit 103 calculates the average of the measurement time #1 and the measurement time #2. The stream control unit 103 stores the calculated average measurement time as time information in the time information storage unit 104.

(S136) Upon receiving the data request notification requesting the data #3 that is input from the stream control unit 103 in step S133, the radio control core 752 requests the radio network control apparatus 300 for the data #3. The radio control core 752 transmits a request signal requesting the data #3 to the radio network control apparatus 300 via the radio base station 200 by radio.

After that, the display processing unit 101, the stream control unit 103, and the radio control core 752 repeat the respective processes illustrated in FIG. 17. When the display processing unit 101 finishes the operation of step S132, the process returns to A of FIG. 17. When the stream control unit 103 finishes the operation of step S135, the process returns to B of FIG. 17. When the radio control core 752 finishes the operation of step S136, the process returns to C of FIG. 17. Note that each time the process is repeated, different sets of data are processed by the display processing unit 101, the stream control unit 103, and the radio control core 752.

Now, calculation of an average measurement time and generation of time information in steps S118 and S135 will be described in greater detail with reference to FIG. 18. FIG. 18 illustrates exemplary operations performed by the radio terminal apparatus 100 when calculating an average according to the second embodiment.

(S151) Upon starting calculation of an average measurement time, the stream control unit 103 stores a record of a currently measured measurement time (the latest measurement time) in the time information storage unit 104. For example, in the case of step S118, the latest measurement time is the measurement time #1. In the case of step S135, the latest measurement time is the measurement time #2.

(S152) After storing the record of the latest measurement time in the time information storage unit 104, the stream control unit 103 determines whether there is a record of a previous measurement time in the time information storage unit 104. If the stream control unit 103 determines that there is a record of a previous measurement time, the process proceeds to step S153. On the other hand, if the stream control unit 103 determines that there is no record of a previous measurement time, the process proceeds to step S156. In the case of step S118, since there is no record of a previous measurement time, the process proceeds to step S156. In the case of step S135, since there is the record of the measurement time #1 as a record of a previous measurement time, the process proceeds to step S153.

(S153) The stream control unit 103 reads the record of the previous measurement time from the time information storage unit 104. In the example of step S135, only the record of the measurement time #1 is stored as a record of a previous measurement time in the time information storage unit 104. However, there may be cases where a plurality of records of previous measurement times are stored. In this case, the stream control unit 103 reads up to a predetermined number (L) of records of measurement times from the time information storage unit 104. In an alternative example, the stream control unit 103 may read all the records of previous measurement times stored in the time information storage unit 104.

(S154) After reading the record of a previous measurement time from the time information storage unit 104, the stream control unit 103 calculates the average of the read previous measurement time and the latest measurement time.

(S155) After calculating the average, the stream control unit 103 sets the calculated average as time information. When the stream control unit 103 finishes the operation of step S155, the process proceeds to step S157.

(S156) If there is no record of a previous measurement time in the time information storage unit 104, the stream control unit 103 sets the latest measurement time as time information. When the stream control unit 103 finishes the operation of step S156, the process proceeds to step S157.

(S157) After setting the time information, the stream control unit 103 stores the set time information in the time information storage unit 104. When the stream control unit 103 finishes the operation of step S157, a series of operations for calculating the average measurement time ends.

The above is the description of the operations of the radio terminal apparatus 100.

(Operations of Radio Network Control Apparatus)

Figure 19:
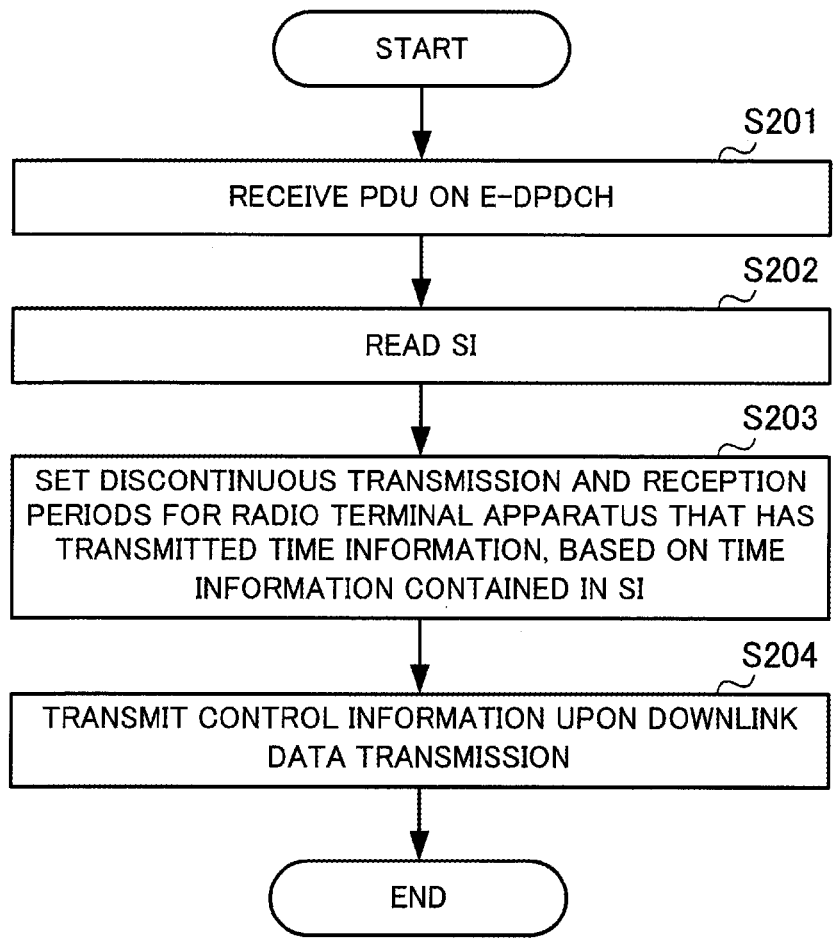
FIG. 19 illustrates exemplary operations performed by the radio network control apparatus when carrying out discontinuous transmission and reception control according to the second embodiment.

Next, operations of the radio network control apparatus 300 will be described with reference to FIG. 19. FIG. 19 illustrates exemplary operations performed by the radio network control apparatus 300 when carrying out discontinuous transmission and reception control according to the second embodiment.

(S201) The radio network control apparatus 300 receives a MAC-i PDU containing time information in an SI field thereof on the E-DPDCH.

(S202) The radio network control apparatus 300 reads the SI field of the MAC-i PDU. Then, the radio network control apparatus 300 extracts the time information contained in the SI field.

(S203) The radio network control apparatus 300 sets discontinuous transmission and reception periods for the radio terminal apparatus 100 that has transmitted the time information, on the basis of the extracted time information. In this step, the radio network control apparatus 300 converts the value of the time information expressed in units of seconds or the like into units of sub-frames or the like (the same units as those of UE_DTX_Cycle_1, UE_DTX_Cycle_2, and UE_DRX_Cycle).

The value of the time information may be directly converted into units of sub-frames or the like on the basis of the length of the E-DCH TTI. Alternatively, the value of the time information may be converted using determination parameters illustrated in FIG. 14.

The radio network control apparatus 300 sets at least one of UE_DTX_Cycle_1, UE_DTX_Cycle_2, and UE_DRX_Cycle to a value based on the time information, for example. The value based on the time information may be (A) a value indicated by the time information, (B) a value adjusted for each parameter with reference to a value indicated by the time information, or the like.

As a method of using the value of (A), there may be a method that sets UE_DTX_Cycle_2 to infinity, and sets only UE_DTX_Cycle_1 to the value indicated by the time information.

As a method of using the value of (B), there may be a method that sets UE_DTX_Cycle_1 to the value indicated by the time information, and sets UE_DTX_Cycle_2 to an integer multiple of UE_DTX_Cycle_1. Further, there may be a method that sets UE_DTX_Cycle_2 to the value indicated by the time information, and sets UE_DTX_Cycle_1 to an integer division of UE_DTX_Cycle_2. Note that there may be a method that is used in combination with either one of the above methods and sets UE_DRX_Cycle to the value indicated by the time information.

(S204) The radio network control apparatus 300 transmits control information to the radio terminal apparatus 100 upon downlink data transmission for starting CPC. The radio network control apparatus 300 transmits control information as a reconfiguration (RRC) message to the radio terminal apparatus 100 upon starting CPC, such that the radio terminal apparatus 100 may prepare for CPC control on the basis of system control parameters (CPC parameters) contained in the control information. In this step, parameters such as UE_DTX_Cycle_1 and the like, which are set by the radio network control apparatus 300 on the basis of the time information, are transmitted to the radio terminal apparatus 100 as system control parameters.

The above is the description of the operations performed by the radio network control apparatus 300 after receiving time information.

The above is the description of the second embodiment. As described above, according to the second embodiment, the discontinuous transmission and reception intervals in CPC are adjusted for each radio terminal apparatus 100, on the basis of time information indicating the time from when data output is started to when the next data is requested. This allows the radio terminal apparatus 100 to discontinuously operate on the basis of the time during which the user does not request data. Thus, it is possible to reduce power consumption of the radio terminal apparatus 100.

(Variations)

In the above description, the discontinuous communication period is adjusted in accordance with time information indicating the time from when image data is displayed to when acquisition of the next image data is requested. However, time information may be adjusted for each type of data, in accordance with the type of data.

For example, first time information that is obtained when the user is viewing images and second time information that is obtained when the user is listening to music may be separately calculated. Thus, an adjustment may be made on the basis of the first time information upon using image software, and an adjustment may be made on the basis of the second time information upon using music software. In this case, a modification may be made such that the stream control unit 103 of the radio terminal apparatus 100 calculates time information for each type of data, and selects time information to be transmitted to the radio network control apparatus 300 in accordance with the type of an application to be used, for example.

According to one embodiment, it is possible to set an appropriate discontinuous communication period.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio terminal apparatus that is operable in a discontinuous communication mode in which at least one of transmission and reception for communicating with a radio base station is performed periodically and discontinuously, the radio terminal apparatus comprising:
    a timer configured to measure time from when download of data via the radio base station is completed to when download of next data is requested in response to a user operation;
    an interface configured to transmit time information on the time measured by the measurement unit to the radio base station; and
    a radio control core configured to acquire, from the radio base station, a parameter indicating at least one of a transmission period and a reception period that is determined by using converting time information indicating correspondence of a value of the time information to the parameter described with units of the transmission period and the reception period, and control the discontinuous communication mode.

2. The radio terminal apparatus according to claim 1, further comprising:
    a display configured to display the data;
    wherein the timer determines a time point when the download is completed, on the basis of a reading completion notification from a display control process that reads the data and causes the display to display the data.

3. The radio terminal apparatus according to claim 1, wherein the interface adds the time information to scheduling information upon transmitting the time information to the radio base station, the scheduling information indicating a request for allocation of radio resources.

4. The radio terminal apparatus according to claim 1, further comprising:
    a memory configured to store the time measured by the timer in association with a type of the data;
    wherein the time information is generated by referring to time associated with a type of data corresponding to a current download state, among previously measured times that are stored in the memory.

5. The radio terminal apparatus according to claim 1, wherein as the time measured by the timer increases, at least one of the transmission period and the reception period that is determined on the basis of the time information increases.

6. A communication control apparatus for use in a radio communication system including a radio base station and a radio terminal apparatus that is operable in a discontinuous communication mode in which at least one of transmission and reception for communicating with the radio base station is performed periodically and discontinuously, the communication control apparatus comprising:
    an interface configured to receive, from the radio terminal apparatus, time information on time from when the radio terminal apparatus completes download of data via the radio base station to when the radio terminal apparatus requests download of next data in response to a user operation; and
    a central processing unit (CPU) configured to determine at least one of a transmission period and a reception period applied when the radio terminal apparatus operates in the discontinuous communication mode, by using converting time information indicating correspondence of a value of the time information to a parameter allocated to at least one of the transmission period and the reception period, and notifies the radio terminal apparatus of the determined at least one of the transmission period and the reception period.

7. A radio communication method executed by a radio communication system including a radio base station and a radio terminal apparatus that is operable in a discontinuous communication mode in which at least one of transmission and reception for communicating with the radio base station is performed periodically and discontinuously, the radio communication method comprising:
    measuring time from when the radio terminal apparatus completes download of data via the radio base station to when the radio terminal apparatus requests download of next data in response to a user operation;
    transmitting time information on the measured time from the radio terminal apparatus to the radio base station;
    determining at least one of a transmission period and a reception period applied when the radio terminal apparatus operates in the discontinuous communication mode, by using converting time information indicating correspondence of a value of the time information to a parameter allocated to at least one of the transmission period and the reception period; and
    transmitting the parameter indicating at least one of the transmission period and the reception period, from the radio base station to the radio terminal apparatus.

* * * * *